(12) United States Patent
Hidaka et al.

(10) Patent No.: US 6,408,960 B1
(45) Date of Patent: Jun. 25, 2002

(54) MOBILE AGRICULTURAL MACHINE

(75) Inventors: Shigehiro Hidaka; Daigo Yokoyama, both of Osaka (JP)

(73) Assignee: Yanmar Agricultural Equipment Co., Ltd. (JP)

(*) Notice: Subject to any disclaimer, the term of this patent is extended or adjusted under 35 U.S.C. 154(b) by 0 days.

(21) Appl. No.: 09/668,160

(22) Filed: Sep. 25, 2000

Related U.S. Application Data

(62) Division of application No. 09/155,496, filed as application No. PCT/JP97/04163 on Nov. 14, 1997, now Pat. No. 6,152,248.

(30) Foreign Application Priority Data

Jan. 23, 1997 (JP) ............................................. 9-25920
Sep. 12, 1997 (JP) ......................................... 9-268-027
Sep. 17, 1997 (JP) ........................................... 9-272220

(51) Int. Cl.[7] ............................................. B62D 11/16
(52) U.S. Cl. ..................... 180/6.38; 180/6.36; 180/6.7; 180/6.66; 477/1; 475/23
(58) Field of Search ................................. 180/6.2, 6.24, 180/6.26, 6.44, 6.32, 6.36, 6.38, 6.7, 6.66, 400, 447; 477/1; 475/18, 19, 23, 24

(56) References Cited

U.S. PATENT DOCUMENTS

| | | | |
|---|---|---|---|
| 2,973,658 A | 3/1961 | Bishop | |
| 4,310,078 A | 1/1982 | Shore | |
| 4,699,021 A | 10/1987 | Waddington | |
| 5,477,454 A | 12/1995 | Ishino et al. | |
| 5,569,109 A | 10/1996 | Okada | |
| 5,590,041 A | * 12/1996 | Copper | ................ 364/424.051 |
| 5,687,811 A | 11/1997 | Shimizu | |

\* cited by examiner

Primary Examiner—Avraham Lerner
(74) Attorney, Agent, or Firm—Harold Gell

(57) ABSTRACT

A mobile cultural machine including right and left traction members, a transmission, and a main speed change device operable to transmit, at any speed ratio, a driving force from an engine through the transmission to the traction members so that they are driven at any traveling speed. A steerage and a steering device operate to cause the steerage to differentiate the traveling speeds between traction members. The traveling speeds are reduced in response to the extent to which the steering device is operated, so that a machine running straight may smoothly be controlled to enter a spinning turn at the end of a row.

76 Claims, 26 Drawing Sheets

Notes: "S." = Sensor, "Direct." = Direction
"Hydra." = Hydraulic, "Aux." = Auxiliary
"C." = Change, "Lev." = Lever Position

MOBILE AGRICULTURAL MACHINE

RELATED APPLICATIONS

This application is a division of U.S. patent application Ser. No. 09/155,496 filed Sep. 23, 1989 now U.S. Pat. No. 6,152,248 which springs from PCT application JP97/04163 filed Nov. 14, 1997.

FIELD OF THE INVENTION

The present invention relates to a mobile agricultural machine such as a combine for continuously reaping and simultaneously threshing grain stalks to be harvested.

BACKGROUND OF THE INVENTION

It has been and is a common practice for drivers of the combines to drive each combine having a pair of right and left crawlers such that it runs along and harvests a row of grain stalks in a farm and then turns itself at an end bare area of the farm before advancing to the next row of grain stalks. The combine has therein a transmission receiving a traction power from an engine and outputting it to the right and left crawlers through a right-side and left-side clutches, respectively. When turning the combine at the bare end, the driver has to switch off one of those clutches to temporarily make idle one of the crawlers. It is disadvantageous that this operation must be done quickly almost at the same time as changing the speed of those crawlers, also undesirably increasing the radius of turn.

It may be possible to employ a pair of oil-hydraulic stepless speed changers to transmit power from the engine to the right and left crawlers, independently of each other. In this case, operations for speed reduction will be easier and the radius of turn will be decreased easily to a noticeable extent. However, it will become more or less difficult for the drivers to steer such a combine to run straight or along somewhat curved rows of grain stalks.

Alternatively, a single oil-hydraulic stepless speed changer may be employed in combination with an oil-hydraulic 'steering gear' or steerage. The former speed changer will transmit engine power in unison to both the crawlers, whilst the latter device increases the speed of outside crawler remote from the center of turn, reducing at the same time the speed of inside crawler facing the center of turn. Such a combine will not only be steered more easily to run straight but also will contribute to a decreased radius of turn. In this case, the combine tends to run at a constant speed whether it advances straight or turns around the center. Therefore, the driver will have to slow down the combine when it must make a "spin" of a very small radius of turn. Thus, the driver have to unwillingly carry out both the operations for turning the combine and for speed change thereof.

A link motion mechanism may be employed in addition to the oil-hydraulic (hereinafter referred to simply as 'hydraulic') steerage so as to automatically slow down the combine when said device is operated, and also to automatically accelerate the combine to its normal speed in harmony with a following operation for causing it to restore its straight-running mode. This way of diminishing the described problems will however give rise to another problem, and indeed, when the combine is adjusted as to its running course relative to a row of grain stalks, its running speed will increase or decrease unintentionally and at random even during normal harvesting works. In such an event, the driver will suffer from a kind of discrepancy between his feeling in driving the combine and its actual motions, disabling him to smoothly and adequately steer the combine.

In general, the driver's manual force applied to a steering wheel or the like parts is transmitted to a 'steering gear' or steerage through a train of reduction gears. The output from the reduction gears for turning a mobile agricultural machine for example the combine is proportional to the angular displacement of the steering wheel. If in such a prior art system a particular farm on which the combine is running along a row of grain stalks to be harvested is more slippery for the crawlers than normal farms, then the combine is likely to make a smaller turning action than expected. If on the contrary the particular farm is less slippery than the normal farms, then the combine will make an overaction when turning. As a result, it is remarkably difficult for the driver to steer the combine along the row of grain stalks that have to be reaped and threshed. He will have to make his best efforts to recover a correct turning motion of the combine, relying solely on his driving sense and ability, lest the combine should turn so late or meander so seriously that it would deviate from said row of grain stalks.

SUMMARIZED DISCLOSURE OF THE INVENTION

The present invention provides a mobile agricultural machine that comprises a pair of right and left traction members, a transmission, a main speed change device operable to transmit at any speed ratio a driving force from an engine through the transmission to the traction members so that the traction members are driven at any traveling speeds, a steerage and a steering device operable to cause the steerage to differentiate the traveling speeds between the traction members, wherein both the transmission and the steerage of the machine have respective power-transmitting structures constructed such that a normal running load at the highest speed is substantially equal to a maximum traveling load when swiveling. Consequently, those transmission and steerage may be formed using stepless reducers almost of the same specification. Reduction ratios of the traction members to the transmission, as well as that of said members to the steerage can thus be designed readily. A sufficient traction force for swivel of a very small radius is also ensured for the traction members.

In the agricultural machine of this principle, the reduction ratio of the output from the steerage may be set greater than that of the transmission for high-speed running. In such a case, the machine can turn at lower speeds at the bare end of a farm, though it usually runs at higher speeds when driven straight for an agricultural work.

In the agricultural machine of the described principle, the reduction ratio of the output from the steerage may be set smaller than that of the transmission for low-speed running. In this alternative case, the machine can turn rapidly at the bare end of a farm, even if it is driven straight at lower speeds for doing an agricultural work.

From still another aspect of the present invention, it provides a mobile agricultural machine that comprises a pair of right and left traction members, a transmission, a main speed change device operable to transmit at any speed ratio a driving force from an engine through the transmission to the traction members so that the traction members are driven at any traveling speeds, a steerage and a steering device operable to cause the steerage to differentiate the traveling speeds between the traction members, wherein the steering device has a ridge-following position, a braked turn position and a spinning turn position, all within a range defined between a straight traveling position and a limit position for the most acute turn of the smallest radius. In this agricultural machine, the steering device can be operated not stepwise but continuously so as to select any one from three modes of following a row of grain stalks or any other plants or following a ridge in a farm, making the gentle braked turn and making the spinning turn at the bare end of said farm. Any driver can thus steer this machine with only his one hand to vary the angle of steering device. It is advantageous that simultaneously with the steering operation, the driver or worker may do with his other hand any other works such as raising or lowering any implements for performing an agricultural work.

At the ridge-following position, the machine can make slowly a very gentle turning motion of a large radius so as to advance along the row or ridge while running at a normal speed. At any spinning turn position for smaller radii, one of the traction members (viz., inside traction members) facing the center of their circular locus will be driven in a reverse direction. The position for braked turn is interposed between those two positions, so that any abrupt and sudden change in the angle of turn is prevented.

In an embodiment of the agricultural machine just summarized above, the maximum angle of steering to which the steering device can be rotated in one angular direction is set at about 135 degrees. A range from 0 degree to about 15 degrees is allotted to the straight traveling position for following the row or ridge. Therefore, the driver or worker can rotate the steering device by 135 degrees with his one hand without any difficulty, so as to cause the machine to make a spinning turn into a reversed direction relative to said rows or ridges. On the other hand, he may thereafter rotate the steering device by up to 15 degrees to gently steer the machine to follow an obtuse or gentle curvature of said row or ridge that is now to be followed.

From a further aspect of the present invention, it provides an agricultural machine comprising a pair of right and left traction members, a transmission, a main speed change device operable to transmit at any speed ratio a driving force from an engine through the transmission to the traction members so that the traction members are driven at any traveling speeds, a steerage and a steering device operable to cause the steerage to differentiate travel speeds between the traction members, wherein the steering device is operatively connected by a differentiator to the steerage in such a manner as to provide a curvilinear relationship between the angular distance or intensity of an input from the steering device to the steerage and the intensity of a resultant controlling output from said steerage. This structure is advantageous in that, even if the right and left traction members on the farm would undergo considerably different ratios of slipping along the farm's right and left zones respectively engaging with said members, there is ensured a congruity for the worker between his feeling of steering the machine and the actual extent of the steering device's angular displacement necessary to make the machine to follow the row or ridge. Thus, it is now possible to diminish the problems of delayed turn due to slow control or meandering run due to acute and/or excessive control. The worker can now adjust and control easily the travel course of the machine while doing an agricultural work.

Preferably, the steering device has a central position for straight run (viz., the ridge-following position in the previous embodiment) and side regions continuing from and sandwiching said position to define a substantially constant central range of control. Such a curvilinear relationship applies only to the central range, so that this relationship then prevailing between the steering device and the steerage will automatically be switched over to a linear and proportional relationship when as said device is operated beyond and outside the central range. The machine is protected well from delay in its turning motion or from meandering when it draws curvatures of greater radii so as to adjust its course relative to the row or ridge while running at higher speeds. The worker can operate the steering device to let the machine make spinning turns of smaller radius at a bare end of the farm, with his normal feeling of driving the machine being not disturbed at all. Thus, the machine is now adapted to both the agricultural works at higher speeds and its turning at lower speeds.

In one example embodying the principle just summarized above, the ratio of a command output from the steerage per unit angular displacement of the steering device within the central range including the central position for straight run is set greater than that which is effective outside said range. In this case, the machine doing an agricultural work can be controlled adequately and quickly to adjust its course along the row or ridge, thus avoiding delay in its turning motion and affording speed-up of agricultural works.

In another example embodying the said principle, the ratio of a command output from the steerage per unit angular displacement of the steering device within the central range including the central position for straight run is set smaller than that which is effective outside said range. In this alternative case, the machine doing an agricultural work on a less slippery farm can be controlled by the worker, without disturbing his feeling of driving the machine, not only preventing it from meandering but also affording speed-up of agricultural works.

From a still further aspect of the invention, it provides a mobile agricultural machine such as a combine comprising a body, a pair of right and left traction members connected to the body, a hydraulic transmission, a differential gear apparatus, the transmission cooperating with the differential gear to transmit a driving force from an engine to the traction members to thereby drive the body at any traveling speeds, and a steering mechanism which in turn comprises a manually steering member and a hydraulic steerage operable to transmit any angular displacement of the manually steering member to the differential gear apparatus so as to differentiate travel speeds between the traction members, with the steering mechanism further comprising differentiating gears for transmitting angular displacement of the manually steering member to the hydraulic steerage. This machine is advantageous in that its body can turn either sharply or gently in response to the extent to which the manually steering member is operated.

The differentiating gears may be designed to amplify an initial output force of the manually steering member such that the machine body makes a sharper turn in response to said initial output force, as compared with the prior art usual machines. Consequently, the machine can be steered adequately and quickly free from any delay in its turning motion.

Alternatively, the differentiating gears may be designed to attenuate an initial output force of the manually steering member such that the machine body makes a gentler turn in response to said initial output force, as compared with the prior art usual machines. Due to this feature, the manually steering member is rendered more adapted for straight run of the machine, and it in turn can be steered adequately.

The manually steering member may be a steering wheel operable in a manner similar to that mounted on the prior art tractors or rice-planters. The worker will not suffer from any disturbance in his feeling of driving the machine when adjusting its travel course or making it to turn.

Alternatively, the manually steering member may be a rockable lever that is capable of rocking for instance sideways, forcing the machine to swing to the right or to the left, or causing it to make a swivel to the right or to the left turn.

A mechanical linkage may be employed to operatively connect the manually steering member to the transmission and the steerage. The linkage is free from any deterioration in its function in the course of time, thus enhancing reliability of the steering mechanism as a whole.

An electronic controller may be employed in place of the mechanical linkage also to operatively connect the manually steering member to the transmission and the steerage, thereby increasing the functional variety of the steering mechanism and also reducing manufacture cost thereof.

THE BEST MODES EMBODYING THE INVENTION

Figure 1:
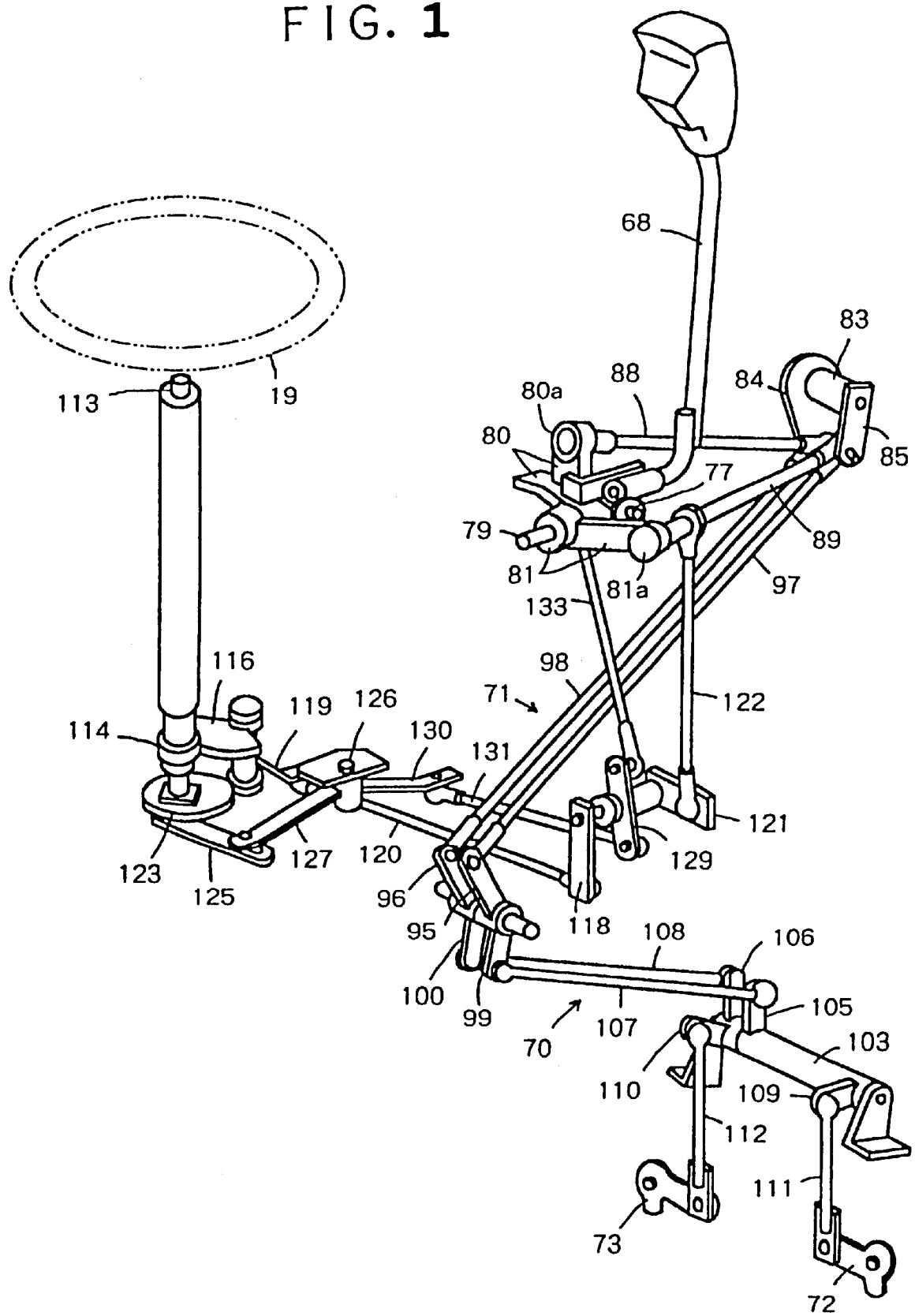
FIG. 1 is a schematic perspective view of a main speed-change lever, a steering wheel and linkages thereof, all employed in a combine provided in accordance with the present invention.
Figure 2:
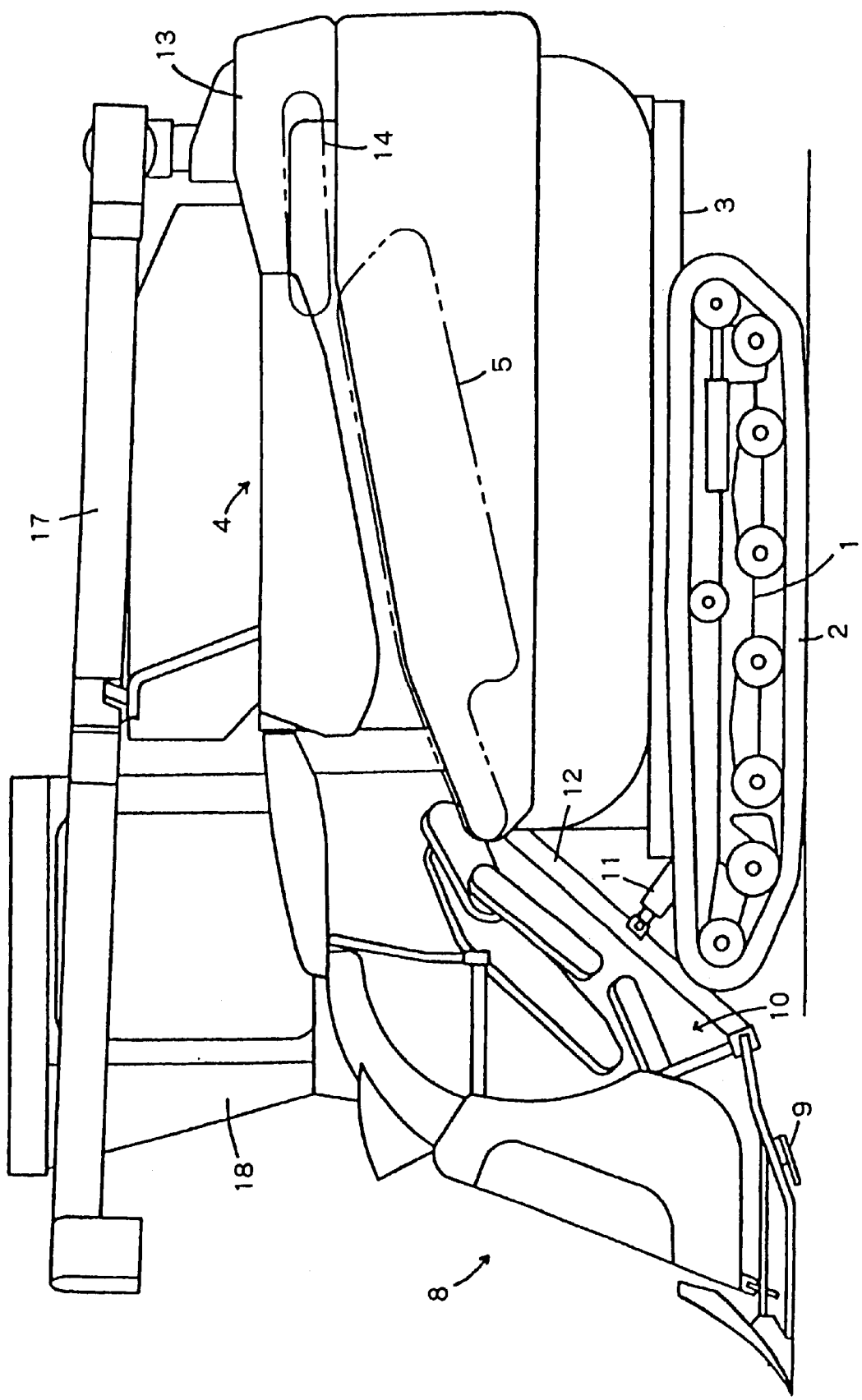
FIG. 2 is a side elevation of the combine shown in its entirety.
Figure 3:
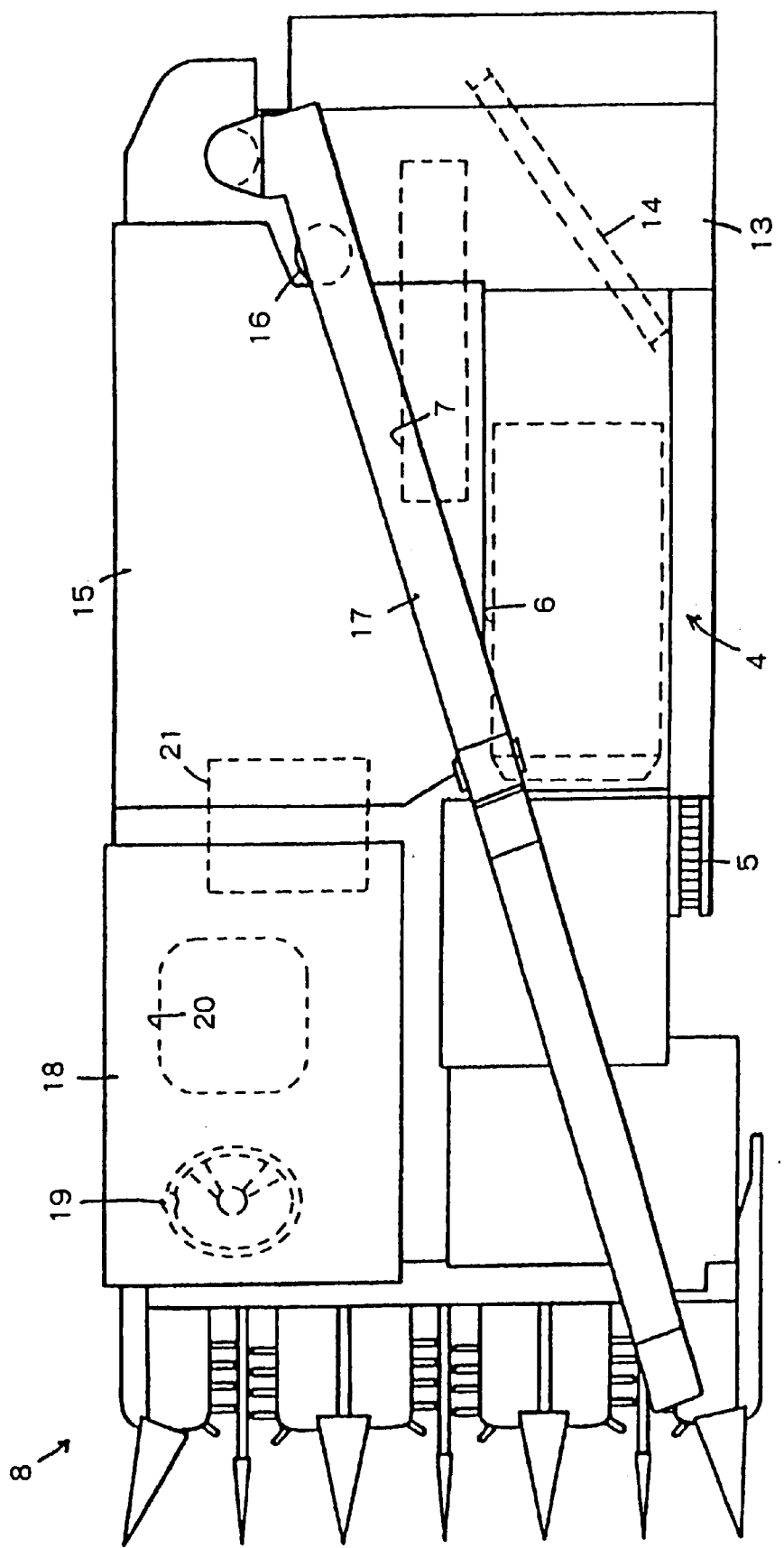
FIG. 3 is a plan view of the combine also shown in its entirety.

Now some embodiments of the present invention will be described with reference to the drawings. In FIG. 1, a main speed change lever and a steering wheel are shown along with their linkages, and in FIGS. 2 and 3 a combine is shown in its side elevational view and in plan view, respectively, both in its entirety. The reference numeral 1 denotes a truck frame on which traction crawlers 2 are supported. A chassis S is mounted on the truck frame 1. The reference numeral 4 generally denotes a thresher comprising a feed chain 5 disposed on a left side of the thresher, a threshing drum 6 and a grain treating drum 7. The further numeral B generally denotes a reaper that has a reaping blade 9 and a stalk conveyor 10. A hydraulic cylinder 11 is connected to a reaping frame 12 so as to raise or lower the reaper 8 as a whole. A waste stalk discarder 13 terminates at a chain 14 for disposing waste stalks. A grain tank 15 receives grain discharged from the thresher 4 through a vertical cylinder 16, and an auger 17 discharges grain out of the tank 15. The numeral 18 denotes generally a driver's cabin in which a steering wheel 19, a driver's seat 20 and so on are disposed. An engine 21 is disposed below the driver's cabin 18 so that this combine can continuously reap and thresh the grain stalks.

Figure 4:
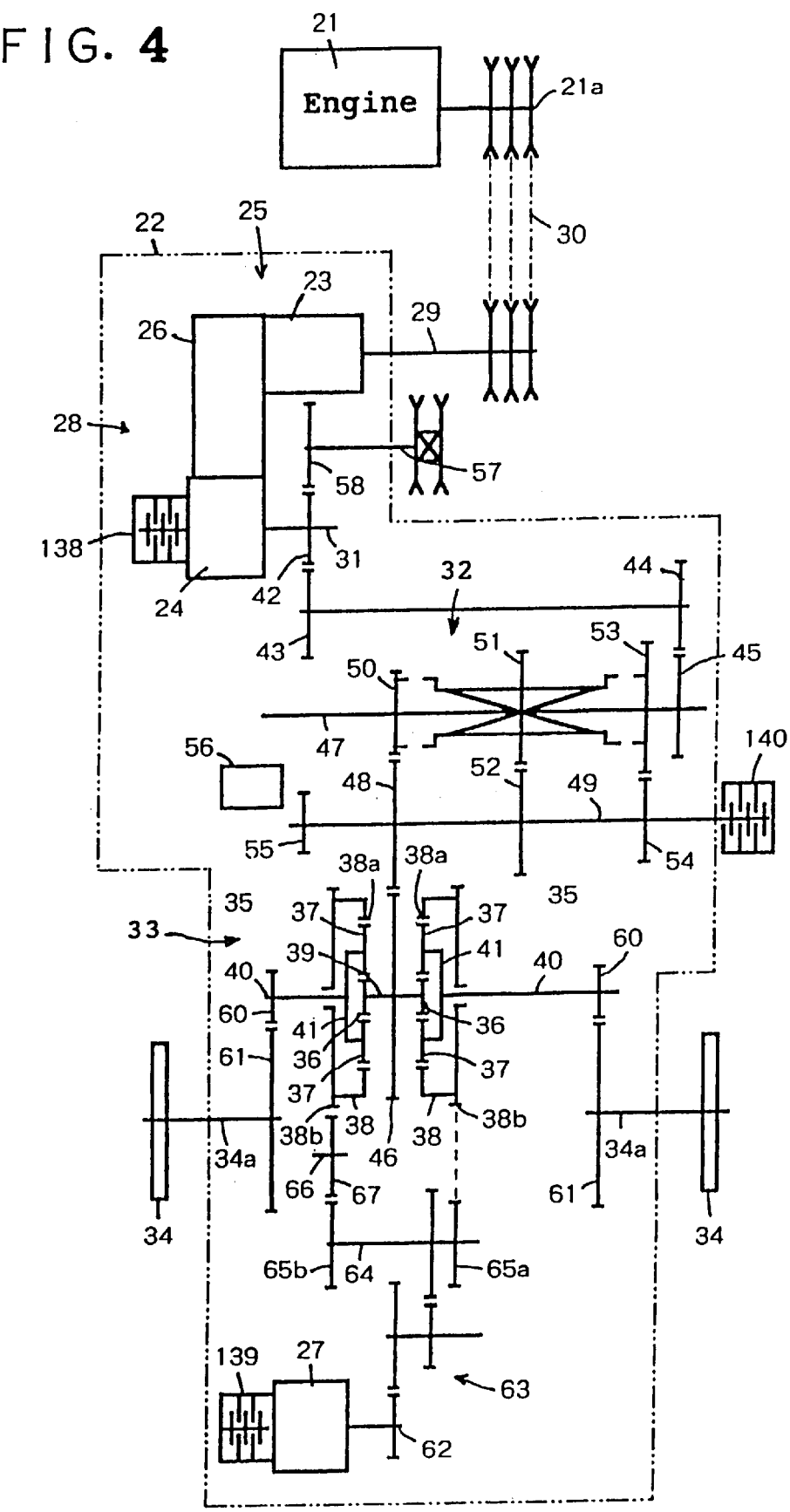
FIG. 4 is a diagram showing a transmission together with members relevant thereto.

As shown in FIG. 4, accommodated in a transmission case 22 are stepless hydraulic speed changers 25 and 28 wherein the former 25 is for driving the combine and the latter for turning same. The speed changer 25 as a main speed changer as a part of 'transmission' comprises a first hydraulic pump 23 and a first hydraulic motor 24 operatively connected thereto. Similarly, the other speed changer 28 as a 'steerage' comprises a second hydraulic pump 26 and a second hydraulic motor 27 operatively connected thereto. The engine 21 has an output shaft 21a for driving through belts 30 a common input shaft 29 of the first and second hydraulic pumps 23 and 26. An output shaft 31 of the first hydraulic motor 24 is operatively connected by an auxiliary speed changer 32 and a differential gear 33 to a drive wheel 34 of the crawlers 2. The differential gear 33 consists of a pair of planetary gear trains 35 and 35 arranged symmetrical with each other. Each planetary gear train 35 generally consists of a sun gear 36, three planet gears 37 disposed outside and in mesh with the sun gear 36, and a ring gear 38 also disposed outside and in mesh with all the planet gears 37.

A shaft 39 of the sun gears 36 extends coaxially with outer shaft 40 of carriers 41, which rotatably support trios of the planets 37, respectively. Thus, the right and left carriers 41 are disposed outside a pair of the right and left sun gears 36. Each ring gear 38 having an internal teeth 38a in mesh with one trio of the planets 37 is located coaxially with the sun gear's shaft 39. Those ring gears 38 are rotatably supported by and on the respective outer shafts.

The main stepless hydraulic speed changers 25 for driving the combine to run is subject to such a control that the angle of a slanted rotary disc within the first hydraulic pump 23 be changed. In response to such a change in angle, normal rotation of the first hydraulic motor 24 will be altered to reverse rotation or vice versa, with the number of rotations of this motor being also varied at the same time. Fixedly secured to the output shaft 31 of the first hydraulic motor 24 is a transmitting gear 42. Intermediate gears 43, 44, 45 and the auxiliary speed changer 32 are arranged in this order to receive power from the transmitting gear 42 and then transmit it to a central gear 46. This central gear fixed on the sun gears' shaft 39 will thus drive the sun gears 36 and 36 to rotate. The auxiliary speed changer 32 comprises a counter shaft 47 having secured thereto one of the intermediate gears 45 and also a parking brake shaft 49. This shaft 49 carries a braking gear 48 secured thereto and kept in mesh with the central gear 46. A pair of low speed gears 50 and 48, another pair of medium speed gears 51 and 52 and still another pair of high speed gears 53 and 54 are arranged in this order on and between the counter shaft 47 and the brake shaft 49. The former gear 50, 51 or 53 in each pair is held on the former shaft 47, with the latter gear 48, 52 or 54 in each pair being on the latter shaft 49. The middle gear, namely the medium speed gear 51 can slide on and along the counter shaft 47 50 as to select low speed, medium speed or high speed. (There are idle regions between the low and medium speeds and between the medium and high speeds.) A tachometric gear 55 is fixed on the brake shaft 49, and signals from this gear will be received by a speed sensor 56 for detection and indication of the combine's speed. A PTO shaft (viz., power take off shaft ) 57 for the reaper B is rotated by a PTO gear SB engages with the transmitting gear 42 fixed on the output shaft 31 mentioned above.

A torque output from the first hydraulic motor 24 will be transmitted to the sun gears' shaft 39 via the central gear 46. The carriers' outer shafts 40 respectively receive this torque through the right and left planetary gear trains 35, consequently those outer shafts 40 rotate the drive wheels 34 through respective pairs of reduction gears 60 and 61. The downstream reduction gears 61 are fixed on right and left axles 34a of those drive wheels.

The other stepless hydraulic speed changer 2a for turning the combine is also controllable, since the angle of a slanted rotary disc installed in the second hydraulic pump 26 is changeable to switch over the direction in which the second hydraulic motor 27 rotates, from forward to reverse or vice versa. The number of rotations of this motor 27 will also be varied by changing the slanted rotary disc. An output shaft 62 of the second motor 27 has fixed thereon an output gear that is connected to a gear train 63. A swiveling power shaft 64 has fixed thereon a pair of input gears 65a and 65b respectively driving the ring gears 38. The right input gear 65a is in a direct connection with the external teeth 38b of the right ring gear 38, whereas a reversing gear 67 fixed on a reversing shaft 66 intervenes between the left input gear GSb and the left ring gear 38. When the second hydraulic motor 27 rotates in a normal or forward direction, the left ring gear 38 will rotate in a forward direction whilst the right one 38 rotating in a reversed direction but at the same speed.

In one mode of operation, the second hydraulic motor 27 for turning the combine may be stopped to keep still both the right and left ring gears 38, with the first hydraulic motor 24 being switched on to drive the combine to run straight. In this state a torque output from the latter motor 24 will be transmitted to both the right and left sun gears 36 at the same speed, via the central gear 46. Thus, that torque will be given through the planets 36 and carrier 41 in each of the right and left planetary gear trains 35 to the reduction gears 60, which in turn rotate the mating reduction gears 61 so as to drive both the axles 34a. Thus, both the right and left crawlers are driven in unison at the same speed and in the same direction whereby the combine will advance straightly forward or backward. In another mode, the first hydraulic motor 24 for straight advance of the combine may be stopped to hold still both the right and left sun gears 38, with the second hydraulic motor 27 for turning the combine being activated either in a forward or reversed direction. As a result, the left planetary gear train 35 will be driven in a forward or reversed direction, with the right one 35 being driven in a reversed or forward direction, thereby causing the combine to make a spin in situ.

In still another mode, both the first and second hydraulic motors 24 and 27 will be activated for forcing the advancing combine to the right or to the left in such a manner as if drawing a curve of much greater radius. This radius depends on variable difference between the linear speeds of right and left crawlers 2.

As illustrated in FIGS. 5 to 13, a main speed change 10 lever 68 for manual operation is operatively connected to the stepless hydraulic speed changer 25 for propelling the combine. On the other hand, a steering wheel 19 is connected to the other stepless hydraulic speed changer 28 for turning the combine. Those lever 68 and wheel 19 are linked up with one another within a mediate cooperative mechanism 69, before reaching the respective speed changers 25 and 2B. In more detail, a linkage 70 for the speed change lever 68 intervenes between cooperative mechanism 69 and a control lever 72 of the one speed changer 25. Similarly, a further linkage 71 for the steering wheel 19 intervenes between said mechanism 69 and a further control lever 73 of the other speed changer 28.

The mediate cooperative mechanism 69 comprises a rotary disc 75 on which a cylindrical support 74 is fixed for holding a bent lower end 68a of the main speed change lever 68, so that the latter may be rocked sideways in either transverse direction. Also incorporated in the mechanism 69 is a base plate 78 secured to a frame portion 76 of the combine body, and this base plate 78 has fixed thereon a transverse first pivot 77 supporting and allowing the rotary disc 75 to rock fore and aft. The cooperative mechanism 69 further comprises a longitudinal second pivot 79 extending perpendicular to the first pivot 77 so as to support a speed change connector 80 rockable transversely. Still further incorporated in said mechanism 69 is a steering connector 81 also journaled on the second pivot 79 and thus rockable sideways in the transverse direction. Those connectors 80 and 81 have their output ends 80a and 81a offset from the second pivot 79 and operatively connected to the linkage 70 for speed change system and to the other linkage 71 for the steering system, respectively.

Details of these two linkages 70 and 71 are as follows. An external cylindrical shaft 83 is fitted rotatably on and coaxial with an internal columnar shaft 82, both allowing the members supported thereon to make rocking motions. A speed change arm 84 pivoted on said external shaft 83 rearwardly of the mediate cooperative mechanism 69 is supported by the frame portion 76. A steering arm 85 has its basal end fixed to the internal shaft 82, this arm being one of members that invert the direction of a manually produced command force for steering the combine. Connecting rods 88 and 89 each have universal joints at their ends and connect the output ends Boa and ala to the speed change arm 84 and steering arm 85. A steering output arm 91 is fixed to the right-hand end of the internal shaft 82. An intermediate shaft 94 is fixedly secured to a plumber block 93 rotatably supporting a fulcrum shaft 92 for the tiltable cabin 18. First rocking arms 95 and 96 respectively functioning in the speed change and steering systems and attached to the intermediate shaft 94 are rotatable there around. These arms 95 and 96 have their ends operatively connected respectively to corresponding ends of the speed change arm 84 and steering output arm 91, by universal-jointed first rods 97 and 98. Second rocking arms 99 and 100 also serving for the speed change and steering systems and attached to the intermediate shaft 94 will be caused to swing in unison with the first rocking arms 95 and 96, respectively. A stationary core shaft 102 is secured to the top of the transmission case 22, by means of 'plumber plates' 101. Cylindrical shafts 103 and 104 also included in the respective Systems are rotatably supported on and by the core shaft 102. First rockable arms 105 and 106 respectively functioning in the speed change and steering systems and attached to the cylindrical shafts 103 and 104 are thus rotatable around the stationary core shaft 102. These arms 105 and 106 have their ends operatively connected respectively to corresponding ends of the second rocking arms 99 and 100, by universal jointed second rods 107 and 108. Second rockable arms 109 and 110 respectively serve for the speed change and steering systems and have their ends also respectively attached to the cylindrical shafts 103 and 104. These arms 109 and 110 have their other ends operatively connected respectively to corresponding ends of the control levers 72 and 73, by universal-jointed third rods 111 and 112. By virtue of the two linkages 70 and 71 as detailed above, the operator of this combine may manipulate the control lever 72 by rotating the speed change connector 80 around the first pivot 77 in order to control the running speed of the combine. He can also manipulate the other control lever 73 by rotating the steering connector 81 around the second pivot 79 in order to turn the combine or to adjust its path while it is running. On the other hand, the steering wheel 19 is operatively connected to a column 113 disposed below said wheel. A pinion 114 fixedly attached to a lower portion of the column 113 is in mesh with a gear 116 of a sector shape and fixed on a vertical shaft 115. This shaft 115 is located rearwardly of the pinion 114, and a steering horizontal shaft 117 is arranged below the main speed change lever 68. A first rocking link 118 is connected at one of its ends to this horizontal shaft 117 to depend therefrom. An output arm 119 has its basal end fixed to the vertical shaft 115. A first steering rod 120 having at its ends universal joints and included in the steering system connects the other end of the first rocking link 118 to the distal end of the output arm 119. A second rocking link 121 also has its one end attached to the horizontal shaft 117 so as to rotate in unison with the first rocking link 118. A second steering rod 122 connects the other end of the former link 121 to the forward end of the connecting rod 89, so that the rotation of the steering wheel 19 causes the steering connector 81 to rotate around the second pivot 79.

Disposed below the pinion 114 on the column 113 is a control plate 123 for detecting current state or position of the steering system and always urging it towards its neutral position. In detail, a stud 124 protrudes downwards from the control plate 123 in order to serve as a pivot for connecting thereto one end of a position detecting link 125. A reduction arm shaft 126 located on the right side of the vertical shaft 115 rotatably holds one end of a first rocking arm 127. This arm 127 has at its other end a pin 128, and a slot 125a formed in the other end of the detecting link 125 engages with this pin 128 in a sliding manner. A reduction arm 129 disposed on the steering horizontal shaft 117 and a second rocking arm 130 disposed on the reduction arm shaft 126 have their one ends connected to each other by a first universal-jointed reduction rod 131. A reduction shaft 132 located on the right side of and most remote from the speed change connector 80 is connected by a second universal-jointed reduction rod 133 to the other end of the second rocking arm 130. Thanks to the described structural feature, as the steering wheel 19 is operated further and further while driving the combine at any speed, the second reduction rod 133 will be pulled down deeper and deeper to reduce that speed more and more. Further, a coiled spring Si having its ends secured to the rotary disc 75 and the speed change connector 80 will cause the latter to restore its normal position for driving the combine to run on a straight path when the steering wheel 19 is returned to neutral position. The rotary disc 75 has a stopper bolt $V_1$ that protrudes from said disc a ready adjustable length. The end of a body of this bolt $V_1$ abuts against the rotary disc 80 so that the running speed of the combine will restore its normal value as the steering wheel 19 return to its normal posi-tion for the straight running of the combine. In a standard state wherein the main speed change lever 68 for manual operation and the steering wheel 19 are kept at their neutral positions, the relevant members will take the following positions or be placed in the following states: that the second pivot 79 allowing the speed change connector 80 as well as the steering connector 81 to rotate around said pivot be in flush with a universal joint 89a connecting the connect my shaft 89 to the steering arm 85, on and along longitudinal and horizontal line $L_1$; that the first pivot 77 be not only in flush with a universal joint 88b of a connecting shaft 88 connecting thereto an output shaft 86 and a further universal joint 89b of a connecting shaft 89 connecting thereto to a further output shaft 87, on and along a transverse and horizontal line $L_2$ lying perpendicular to the longitudinal and horizontal line that $L_1$ still further universal joint 89a of the connecting shaft 88 connecting thereto the speed change arm 84 be in flush with the universal joint 89a, on and along a further transverse and horizontal line $L_3$ lying in parallel with the horizontal line $L_2$; and that the universal joint 88a take its position closest to the other universal joint 89a. Under such a condition, even if either the main speed change lever 68 or the steering wheel 19 would be operated, the speed change connector 80 or the steering connector 81 will merely be permitted to rotate idly about the first pivot 77 or the second pivot 79, without applying any force to the corresponding connecting shaft 88 or 89, respectively.

Figure 9:
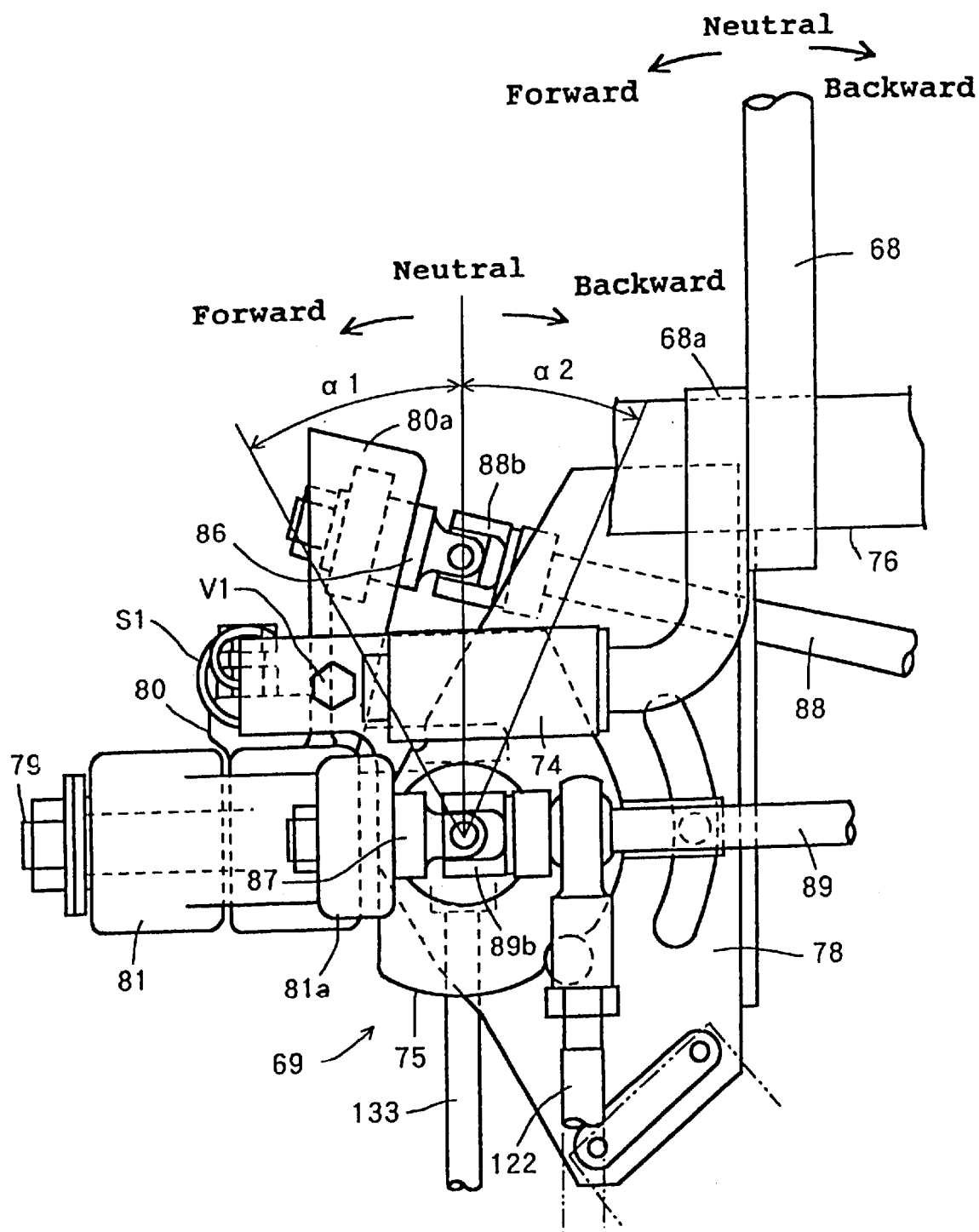
FIG. 9 is a side elevation of members included in the operation part.
Figure 10:
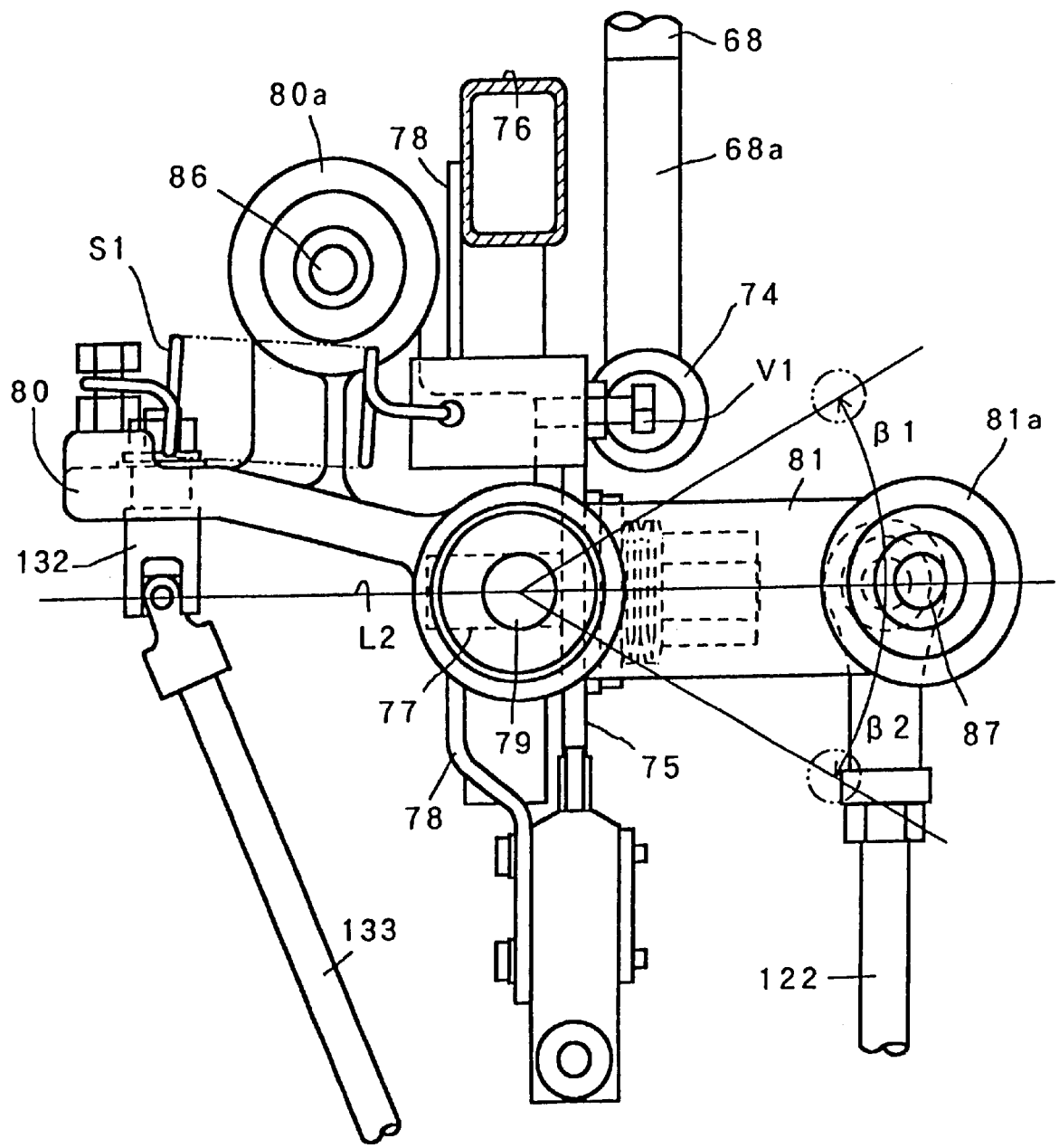
FIG. 10 is a front elevation of the members included in the operation part.
Figure 11:
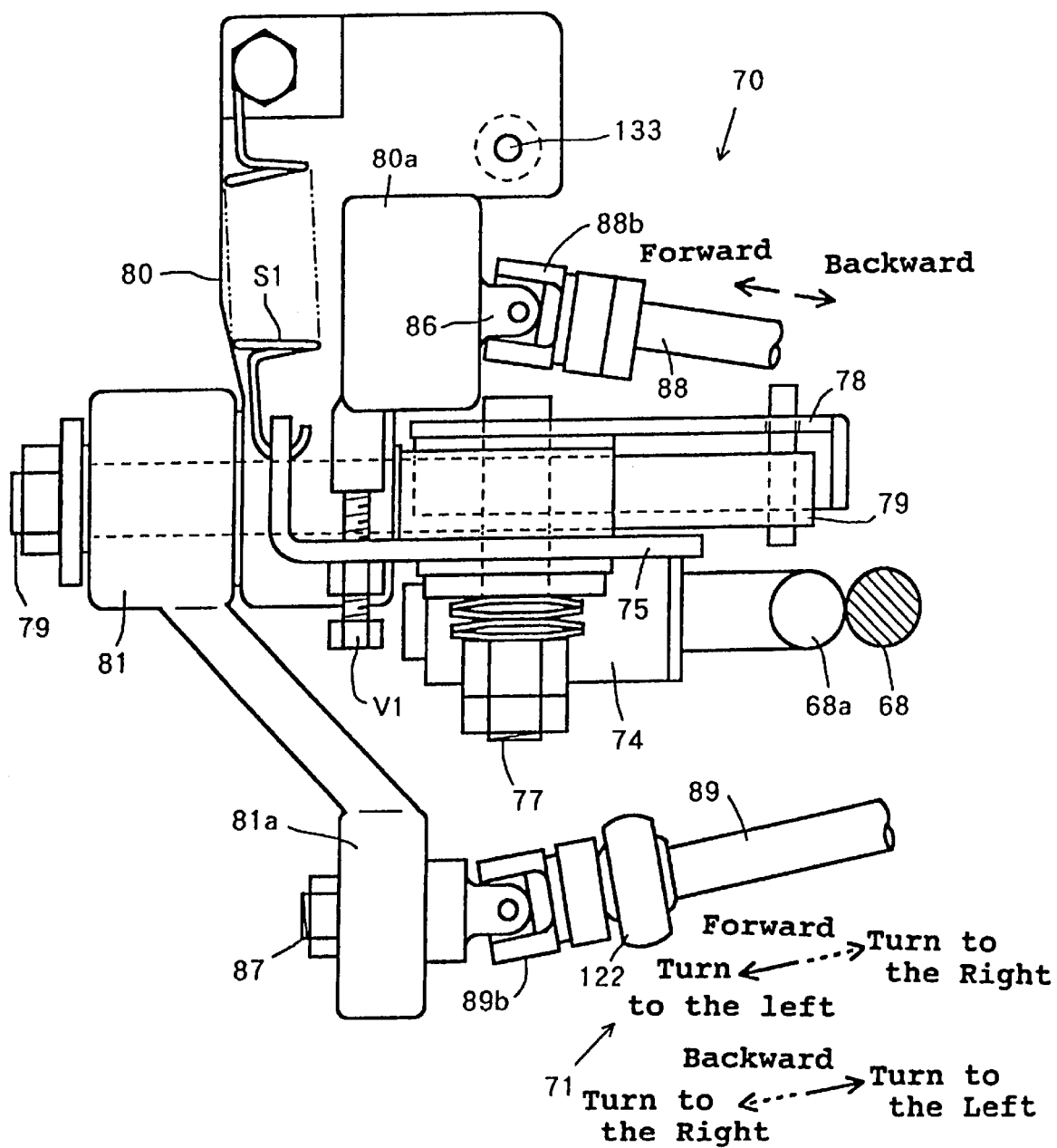
FIG. 11 is a plan view of the members included in the operation part.

In operation, the main speed change lever 68 will be shifted either to its forward-traveling position or to its rearward one, as shown in FIG. 9. In response to this action of the driver, the speed change connector 80 will tilt forwards by an angle of $\alpha_1$ or rearward by an angle $\alpha_2$. Consequently, the connecting rod 88 is pulled or pushed to cause the speed change arm 84 to take its position making the combine to run forwards or rearwards. When the combine has to be steered to turn or somewhat skew while the main speed change lever 68 is kept out of its neutral position, the steering wheel may be rotated causing the relevant members to move in a manner as shown in FIG. 11. As a result, the steering connector 81 will either swing up by an angle of $\beta_1$ or swing down by an angle $\beta_2$. Consequently, the connecting rod 89 is pulled or pushed so as to cause the steering arm 85 to take its position forcing the combine either to the right or to the left. Even if the driver makes an action for turning the combine while the main speed change lever is at its neutral position, the connecting rod 89 will merely move on a conical surface whose center lies on the line $L_1$. Such a motion of the rod 89 is not effective to change the distance between the joints 89a and 89b, failing to move the steering arm 85. However, the same action may be done by the driver while the main speed change lever is kept out of its neutral position. In this case, the steering arm 85 will make an effective motion to turn or swivel the combine. On the other hand, if the main speed change lever is switched over from its forward-traveling position to its rearward one, or vice versa, the direction in which the second hydraulic motor 27 rotates will consequently be inverted fore to aft, or aft to fore.

Normal direction in which the first hydraulic motor 24 rotates may be allotted to the forward running of the combine. If the first hydraulic motor 24 is switched over to its rearward running condition to rotate in the reverse direction, the planetary gear train 35 driven by the second hydraulic motor 27 will also be switched over to its reverse operation state. In order that the steering wheel 19 can swivel the combine in the same direction whether the combine is running forward or backward, the angle at which the disc installed in the second hydraulic pump 26 is slanted will also be reversed. Thus, the second hydraulic motor 27 rotates in a direction contrary to that in which it has been rotating while the first hydraulic motor 24 has been rotating in either direction (despite the unchanged direction in which the input shafts of first and second hydraulic pumps 23 and 26 rotate).

In detail, the speed change connector 80 is slanted forward by an angle $\alpha_1$ or less when the combine is running forward. In this state, with the steering wheel 19 being rotated to the right, the second steering rod 122 will be pulled to slant down the steering connector 81 by an angle of $\beta_2$ or less. The output end 81a of this connector 81 will thus be displaced towards the steering arm 85, which consequently rotates about the internal columnar shaft 82 away from the connector 81 (counterclockwise in FIG. 5 ). This motion will be transmitted through the first and second rods 98 and 108 and other members to the control lever 73, thereby causing the latter to rotate downward. As a result, the second hydraulic motor 27 is driven to rotate in such a normal direction that the combine running forward will swing to the right (with the left-hand crawler 2 revolving at a higher speed than the right-hand one).

Also in that state of the combine running forward, if the steering wheel 19 is rotated to the left, then the second steering rod 122 will be pushed up to slant upward the steering connector 81 by an angle of $\beta_1$ or less. The output end 81a of this connector 81 will thus be displaced away from the steering arm 85, which consequently rotates about the internal columnar shaft 82 towards the connector 81 (clockwise in FIG. 5). This motion will be transmitted to the control lever 73, thereby causing the latter to rotate upward. As a result, the second hydraulic motor 27 is driven to rotate in such a reverse direction that the combine running forward will swing to the left (with the right-hand crawler 2 revolving at a higher speed than the left-hand one).

In contrast, the speed change connector 80 is slanted rearward by an angle $\alpha_2$ or less when the combine is running backward, being led by its tail. In this state, with the steering wheel 19 being rotated to the right, the second steering rod 122 will be pulled to slant down the steering connector 81 by an angle of $\beta_2$ or less. The output end 81a of this connector 81 will thus be displaced away from the steering arm 85, which consequently rotates about the internal columnar shaft 82 towards the connector 81 (clockwise in FIG. 5). This motion will be transmitted to the control lever 73, thereby causing the latter to rotate upward. As a result, the second hydraulic motor 27 is driven to rotate in such a reverse direction that the combine running backward will swing to the right (with the left-hand crawler 2 revolving at a higher speed than the right-hand one).

Figure 5:
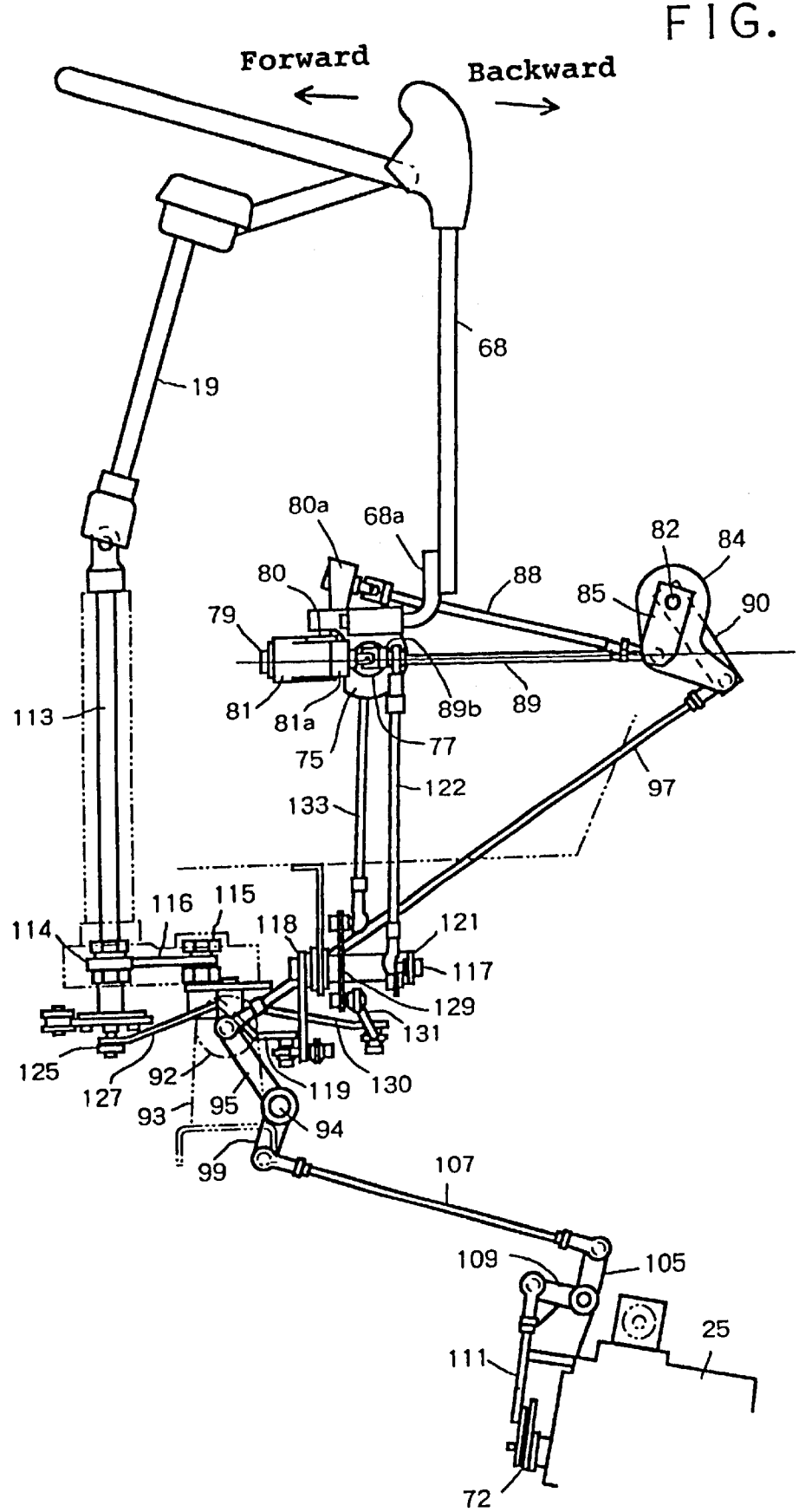
FIG. 5 is a diagram of an operation part comprising members operably connected to the transmission and a steerage.
Figure 6:
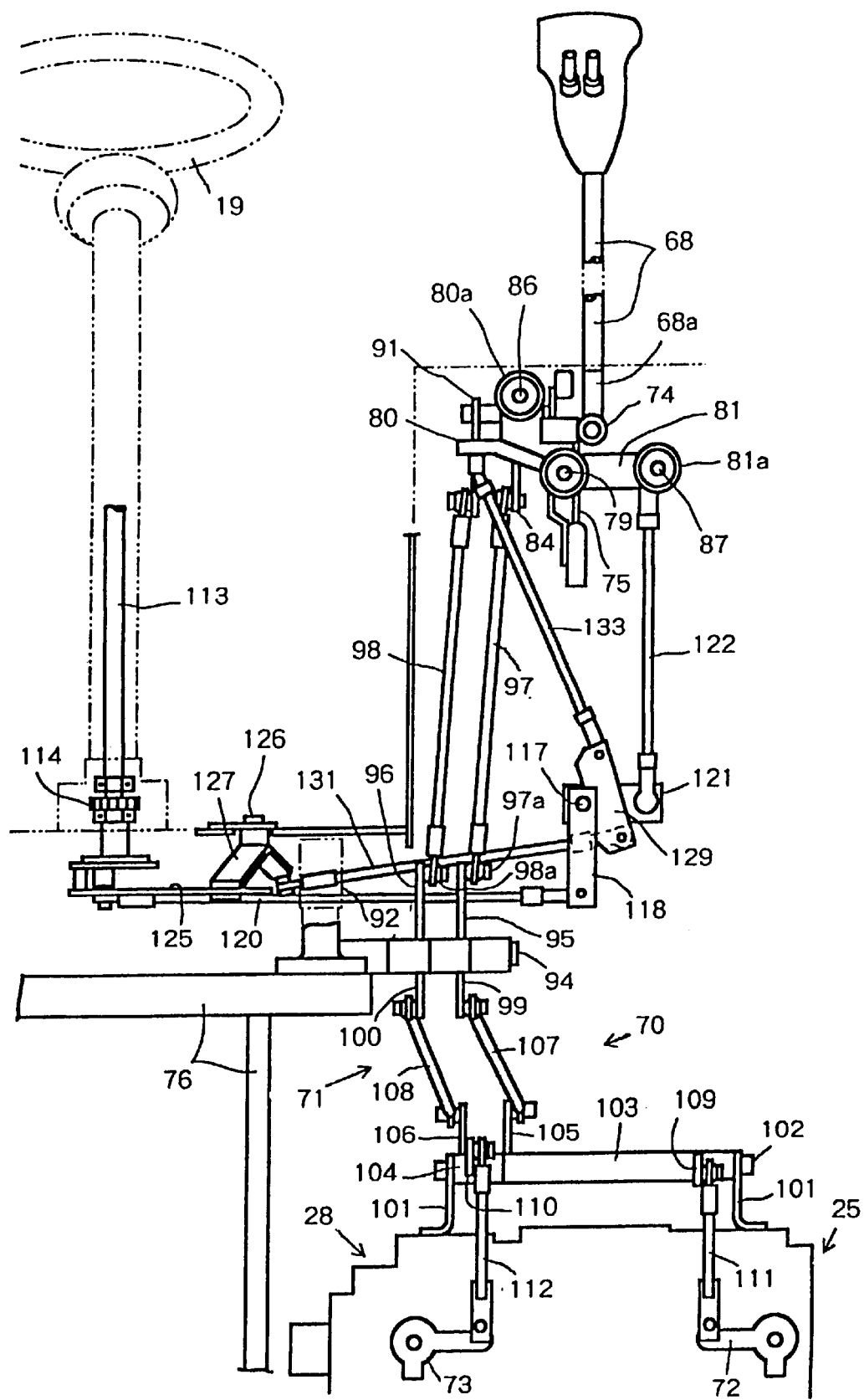
FIG. 6 is a front elevation of the operation part.
Figure 7:
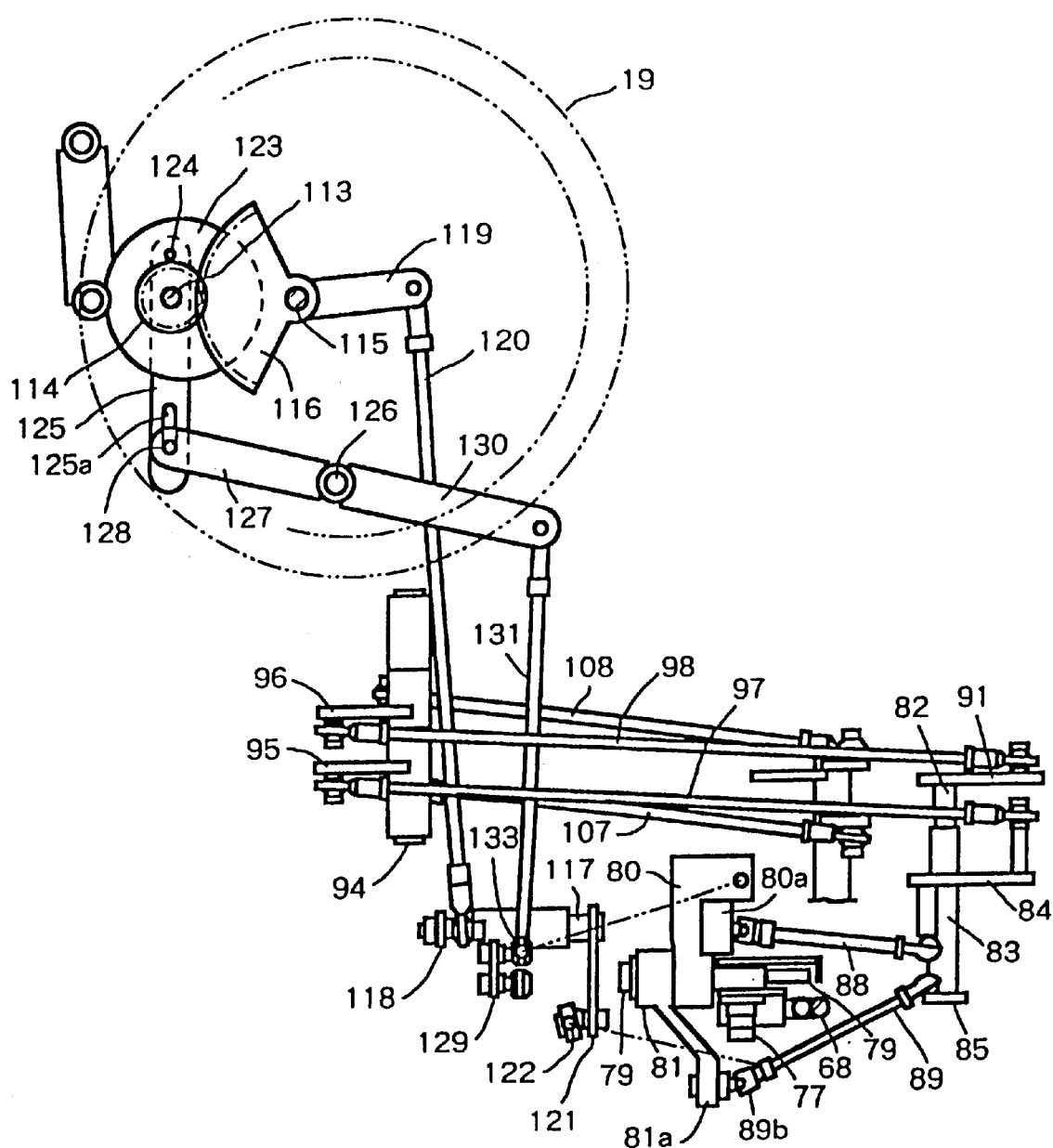
FIG. 7 is a plan view of the operation part.
Figure 8:
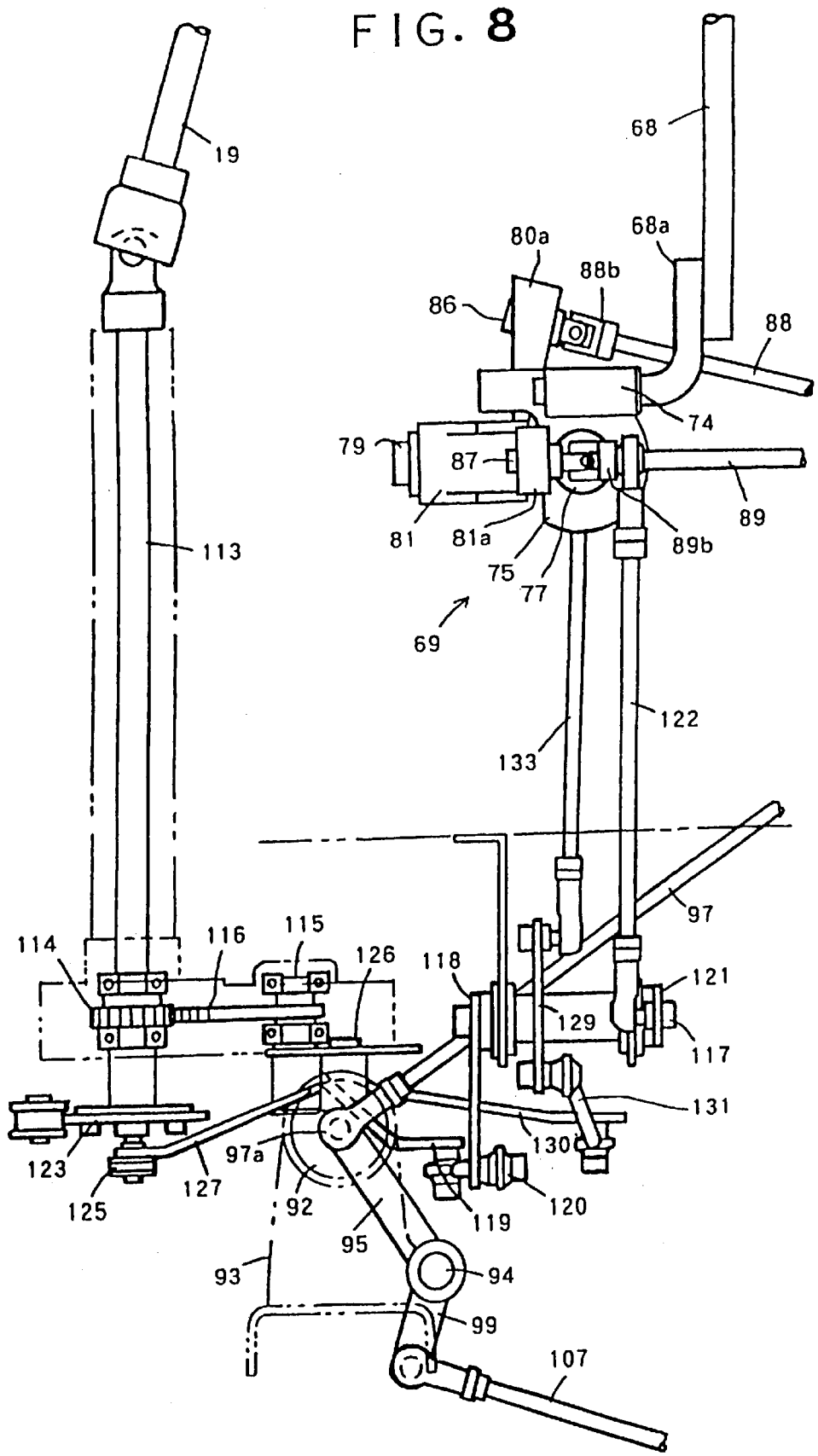
FIG. 8 is a side elevation of the operation part.

Also in that state of the combine running backward, if the steering wheel 19 is rotated to the left to slant upward the steering connector 81 by an angle of a 1 or less, then the output end 81a thereof will be displaced towards the steering arm 85, which consequently rotates about the internal columnar shaft 82 away from the connector 81 (counterclockwise in FIG. 5). This motion will be transmitted to the control lever 73, thereby causing the latter to rotate downward. As a result, the second hydraulic motor 27 is driven to rotate in such a normal direction that the combine running backward will swing to the left (with the right-hand crawler 2 revolving at a higher speed than the left-hand one).

In the described operation for swinging or turning the combine running forward (being led by its head) or backward (being led by its tail), the steering arm 85 acts in different directions. Thanks to this feature, the steering wheel 19 need be rotated to the right if and when the combine must swing to the right whether it is running forward or backward. Similarly, the steering wheel 19 need be rotated to the left if and when the combine must swing to the left whether it is running forward or backward. The round steering wheel 19 employed herein as a manually operative steering member can thus be used in the same manner and with the same feeling of operation as in the usual tractors or rice-planters. The linkages 70 and 71 which mechanically connect the manually operative member to the transmission and the steerage are almost free from any undesirable variation or deterioration thereof as to their motion and function even if used for a long time, thus enhancing reliability of the steering system.

Figure 15:
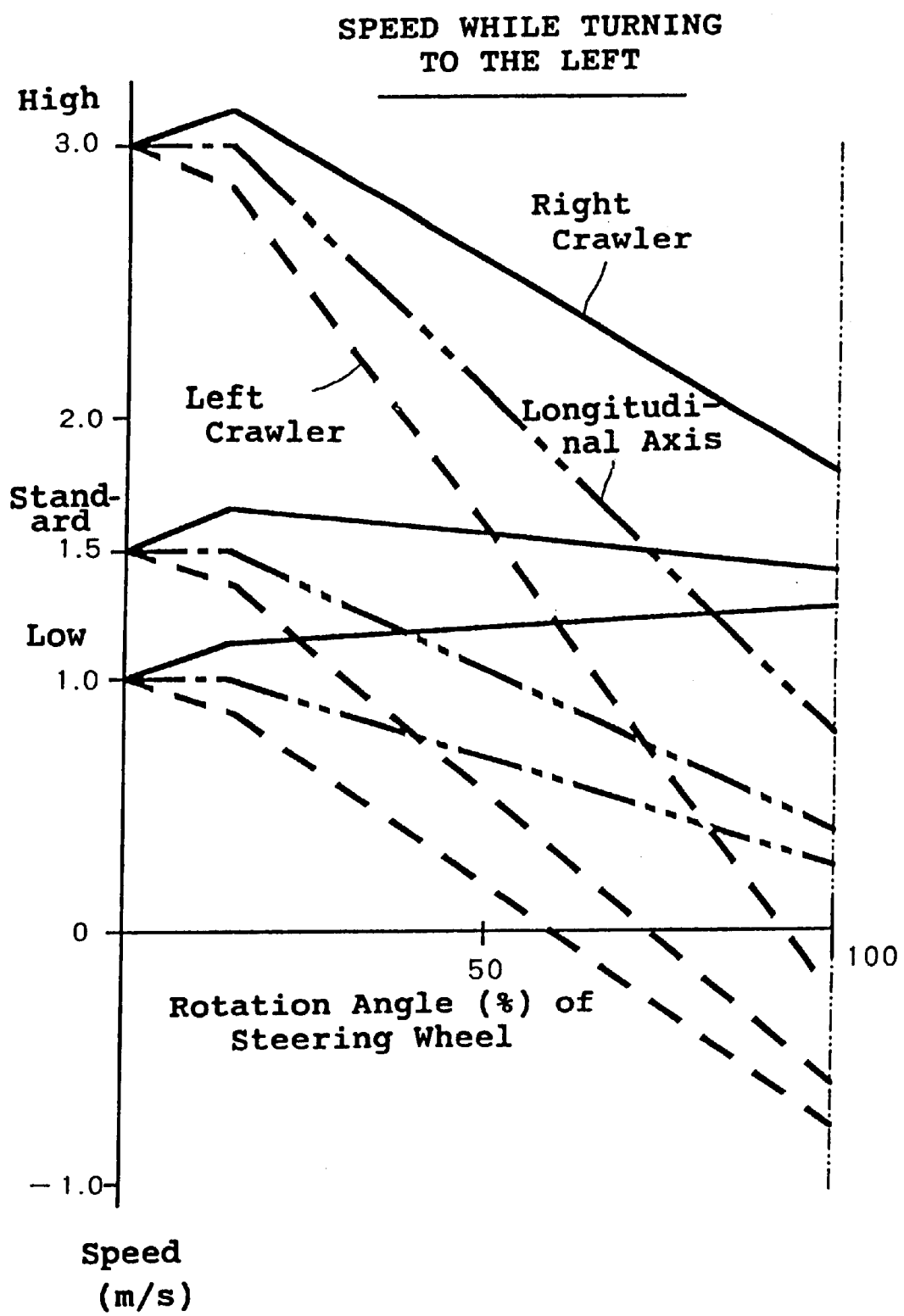
FIG. 15 is a graph showing a relationship observed between a angle of the steering wheel and speeds of crawlers, the wheel being rotated to turn the combine.
Figure 16:
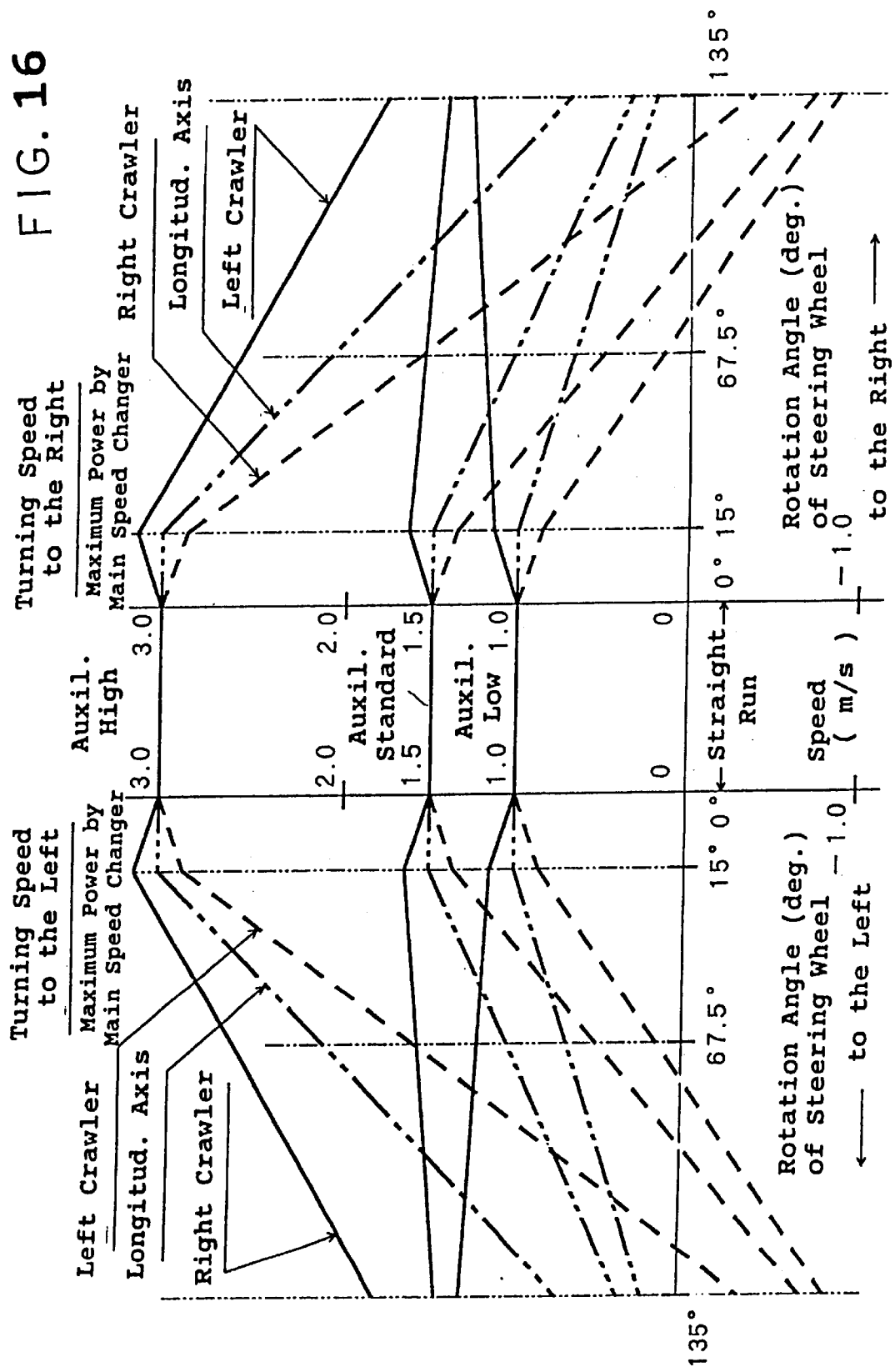
FIG. 16 is a graph showing a relationship between the steering wheel rotated and the speeds reduced thereby.
Figure 17:
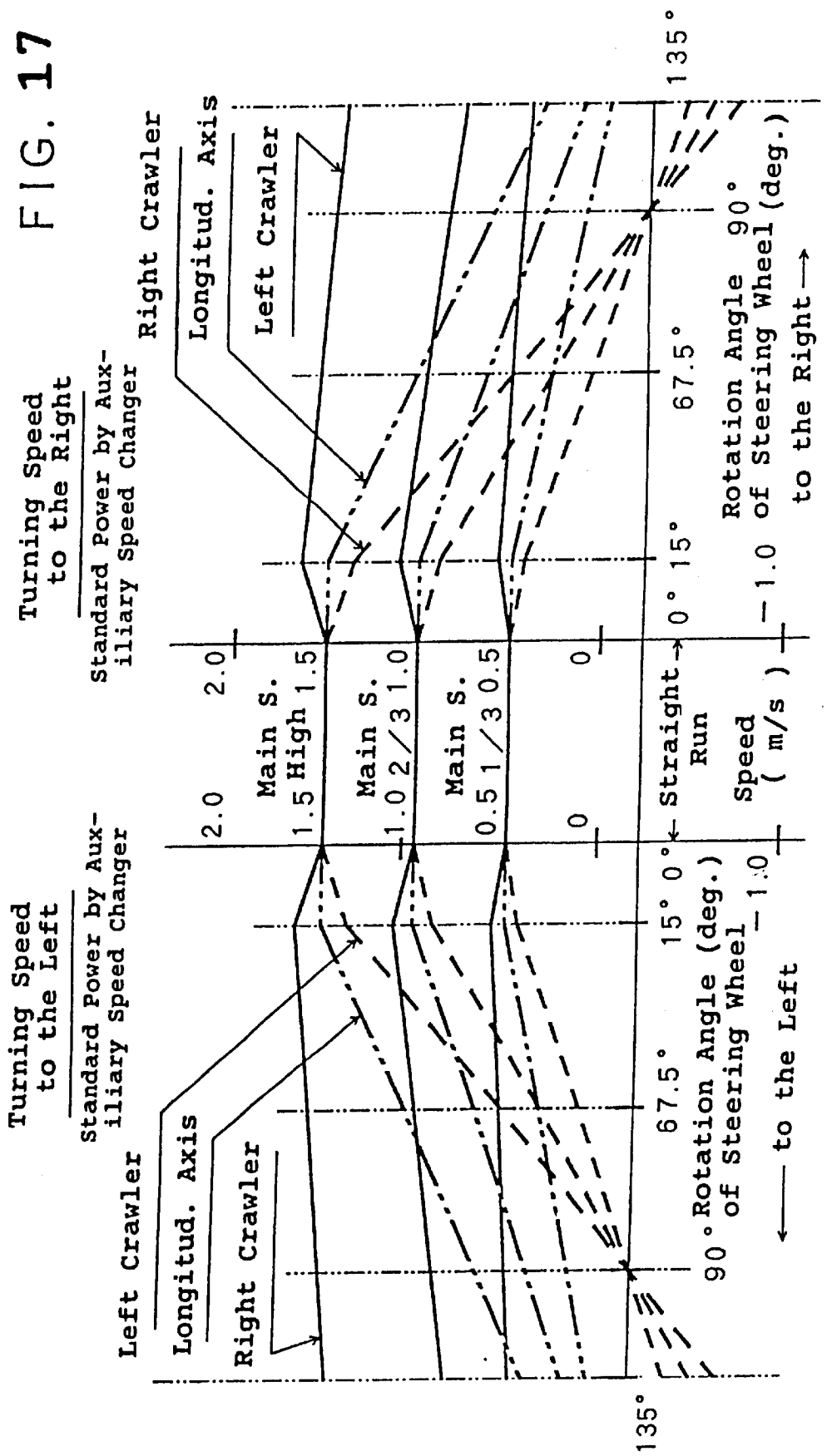
FIG. 17 is a graph showing a relationship between the main speed-change gear's position and the speeds reduced thereby.
Figure 18:
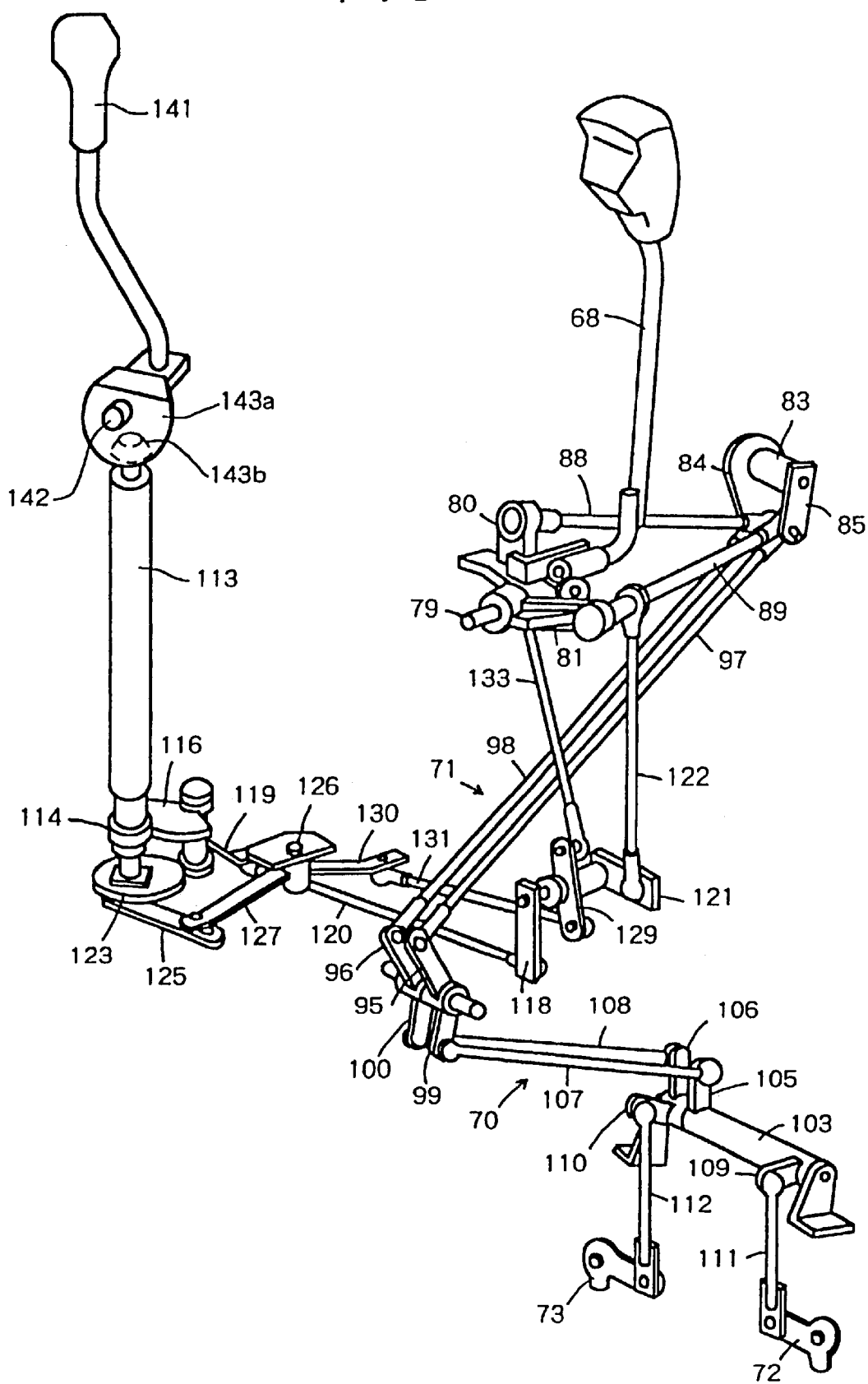
FIG. 18 is a diagram of a steering lever and members relevant thereto.

FIGS. 15 and 16 show the relationship designed and observed between the steered angle given the steering wheel 19 and the speeds of right and left crawlers 2 when the combine is being swung to the left. As will be seen there, larger steered angles of the steering wheel 19 produce greater difference in speed between the crawlers 2. A speed measured along a longitudinal axis of the combine is an average speed of those crawlers 2, and is also reduced corresponding to the level 'high', 'standard' and 'low' of the combine 5 speed. The same relationship will also be observed between the crawlers' speeds even when the combine is being swung to the right, if the word 'right' is read—left—, and 'left is read—right—. As is apparent in FIGS. 15 and 16, an angular movement of the steering wheel 19 by 15 degrees to the left (or to the right ) will cause the pin 128 to slide in and along the slot 125a. The coiled spring Si will then keep the first reduction rod 131 at its straight-traveling position. Due to the pinion 114 in mesh with the gear 116, the first steering rod 120 will be pushed forward (or pulled back) so that the second hydraulic pump 26 and second hydraulic motor 27 will apply a steering force to the crawlers to swing to the left (or to the right). The degree of deceleration of inner crawler facing the imaginary center of swivel is substantially equal to the degree of acceleration of outer crawler, with the speed along the longitudinal center line of the combine remaining almost unchanged to keep the same speed as that of straight running. If however the steering wheel 19 is rotated by more than 15 degrees to either side, the first reduction rod 131 will be released out of its straight-traveling position against the coiled spring $S_1$. Consequently, the first reduction rod 131 will be displaced to control the first hydraulic pump 23 and the first hydraulic motor 24 into their state for decelerating the combine, with both the crawlers being driven in the same direction (forward or backward) but at different speeds. Thus the combine will make a braked turn to the left (or right), due to such a difference in speed between the right and left crawlers 2. If the steering wheel 19 is rotated by 135 degrees, the average speed of the longitudinal axis of combine will be reduced to about a fourth of the speed at which the combine has been running straight. The inner crawler 2 that faces the imaginary center will then be driven reversely to force the combine to make a spinning turn in situ on and about the inner crawler 2. As also seen in FIG. 18, the steering wheel 19 can be rotated by any angle within a range from 0 degree to 135 degrees for turning to the right or left. The driver can now control the combine to correctly follow a row of unreaped grain stalks, by rotating the steering wheel 19 by an angle up to 15 degrees maintaining its straight-traveling speed. On the other hand, he may also rotate the steering wheel 19 by about an angle of 135 degrees when he turns the combine to take a reversed position for the next row of grain stalks. In response to such an operation of the steering wheel, the combine will make a spinning turn at the bare end of a farm, simultaneously decelerated to about a fourth of the straight-traveling speed. As shown in FIG. 17, if the auxiliary speed changer is set at a normal speed (viz., 1.5 meters per second) and the steering wheel 19 rotated by 90 degrees, the main speed change lever 68 can be operated to select 'high' speed, two thirds or one third thereof so as to change the swiveling speed (along the combine's longitudinal axis) without substantially changing the radius of swiveling circle of the combine.

It will now be apparent from the foregoing that the combine provide herein comprises a main speed change lever 68 as the speed change device is operable to transmit through a transmission the power from an engine 21 to right and left crawlers 2 as the traction members. The transmission comprises a first hydraulic pump 23 and a first hydraulic motor 24. A steering wheel 19 as the steering device is operative to produce a difference between the revolving speeds of the crawlers 2, through and by means of a steerage comprising a second hydraulic pump 26 and a second hydraulic motor 27. Characteristically, the steering wheel 19 is operatively connected also to the first hydraulic pump 23 and a first hydraulic motor 24, via a tolerance means in the form of a slot 125a. The central point and a range including same in this slot 125a provide the straight-traveling position for the first hydraulic pump and motor 23 and 24. The range consists of regions located on the respective sides of the central point so as to extend each a given distance therefrom within said slot. Unless the pin is forced beyond the range while steering the combine to follow the row or ridge in a farm, its running speed will not show any unexpected variation such as annoying the driver at any incongruity between his feeling and the combine's actual motion or hindering him from steering the combine easily and correctly.

It also will now be apparent that the auxiliary speed change mechanism is useful in selecting a standard speed for all the positions of the main speed change lever 68, thus altering the swiveling action of combine from a larger radius to a smaller radius, or vice versa. This effect results from an increased variety of reduction ratios not only between the first hydraulic pump and motor 23 and 24 and the crawlers 2 but also between the second ones 26 and 27 and the crawlers. Furthermore, the said effect assures a strong traction power which the combine needs when making a spinning turn of a very small radius. By altering the position of the main speed change lever 68 at any selected state of the auxiliary speed changer, the running speed will be altered without changing the radius of swivel. Thanks to such an improved functional diversity of the combine, any worker can easily drive it in a manner according to his grade of skillfulness.

In summary and in short, the combine provided herein and comprising right and left traction members (viz., crawlers) 2 to which a power from an engine 21 is transmitted through first hydraulic pump and motor 23 and 24 under control by the main speed changing member (viz., lever) 68, and which traction members are changed differentially in their speeds by means of the second hydraulic pump and motor 26 and 27 under control by the steering member (viz. 1 wheel) 19, is advantageous in that its running speed will automatically be reduced responding to the angular extent to which the steering wheel 19 is rotated. By virtue of this feature, the combine can be converted smoothly from its straightly running mode (for doing an agricultural work while adjusting its running course along a row or ridge in a farm) into its swiveling mode (for making a spinning turn at a bare end of the farm while being decelerated at the same time), by continuously and merely operating the steering wheel. In addition, with the steering wheel 19 being rotated to a maximum angle, the combine will be decelerated to a fourth of its normal running speed so that the higher the normal speed, the greater will be a difference between same (for the agricultural work) and its reduced speed (at the bare end), thereby rendering safer and smoother the spinning turn which the combine running faster has to make. Even if running slower, the combine can also turn its direction at the bare end, as quickly as in the case of running faster. In other words, the range of decelerated speeds for a spinning turn remains small whether a wider range of straight running speeds is or is not selected for the agricultural work. Moreover, with the steering wheel 19 being rotated to the maximum angle, a power output from the steerage 26 and 27 will naturally be increased to its maximum value in order to transmit a higher torque to the crawlers to which an increased tractional load is applied when turning at the bare end of the farm. Troubles such as the unwanted stopping of the engine are thus prevented, without aid of no additional operation to accelerate it and thus improving the driver's operation when forcing the combine to turn. In proportion to the extent to which main speed changing member 68 is operated, the difference between the power portions output from the steerage 26 and 27 will also vary to ensure the increased load for the traction members making a turn at the bare end.

The combine provided herein and comprising right and left traction members (viz., crawlers) 2 to which a power from an engine 21 is transmitted through first hydraulic pump and motor 23 and 24 under control by the main speed changing member (viz., lever) 68, and which traction members are changed differentially in their speeds by means of the second hydraulic pump and motor 26 and 27 under control by the steering member (viz., wheel) 19, is advantageous in that a transmitting system for the first hydraulic pump and motor 23 and 24 as well as that for the second ones 26 and 27 are designed on a condition that a maximum running load is substantially equal to a maximum turning load. By virtue of this feature, both the first hydraulic pump and motor 23 and 24 can be designed to form a stepless reduction system of substantially the same specification as that which is formed with the second ones 26 and 27. Therefore, it is now possible to select any reduction ratio of the first hydraulic pump and motor 23 and 24 to the traction crawlers 2, appropriately in relation to the reduction rate of the second ones 26 and 27 to said crawlers, while ensuring a power which the combine requires when making a spinning turn of a very small radius. For example in one case, the latter reduction ratio may be set higher than the former one mentioned above so that the turning at the bare end can be done at a relatively low speed despite a higher speed at which the combine has been and is running. In another case wherein the combine has been and is running at a lower speed, the latter reduction ratio of the second pump and motor 26 and 27 may be set lower than the former one mentioned above as to the first ones 23 and 24 so that the turning at the bare end can be done quickly.

Further, the combine provided herein and comprising right and left traction members (viz., crawlers) 2 to which a power from an engine 21 is transmitted through first hydraulic pump and motor 23 and 24 under control by the main speed changing member (viz., lever) 68, and which traction members are changed differentially in their speeds by means of the second hydraulic pump and motor 26 and 27 under control by the steering member (viz., wheel) 19, is advantageous in that, within a range of the rotation of the steering wheel 19 from a straight running position to a maximum steered position, there are arranged a grain-stalks-row or ridge-following position, a braked turn position and a spinning turn position are arranged in this order. By virtue of this feature, the driver can continuously operate with his one hand the steering wheel to select any one of the ridge-following modes while doing an agricultural work, the braked turn mode and the spinning turn mode at the bare end, while performing with his other hand in unison and in harmony with the steering operation any other operation such as for raising or lowering a cultivator. The braked turn position intervenes between the ridge-following position for running straight (or making a curve of a very large radius) at a normal speed and the spinning turn position to drive one crawler in a reversed direction as if drawing a circle of a very small radius. The presence of such a braked turn position is effective to avoid sharp and sudden changes, if any, in the angle of the combine's turning motion. In a preferable example, the limit for the steering wheel 19 rotating to either side is set at angle of about 130 degrees so that a range from 0 (zero) degree to about 15 degrees is allotted to the ridge-following position. The driver may turn the combine at the bare end by rotating with his one hand the wheel 19 to the limit of 135 degrees, wherein a gentle curving motion is also possible for the combine to follow the row of stalks or the ridge.

Figure 12:
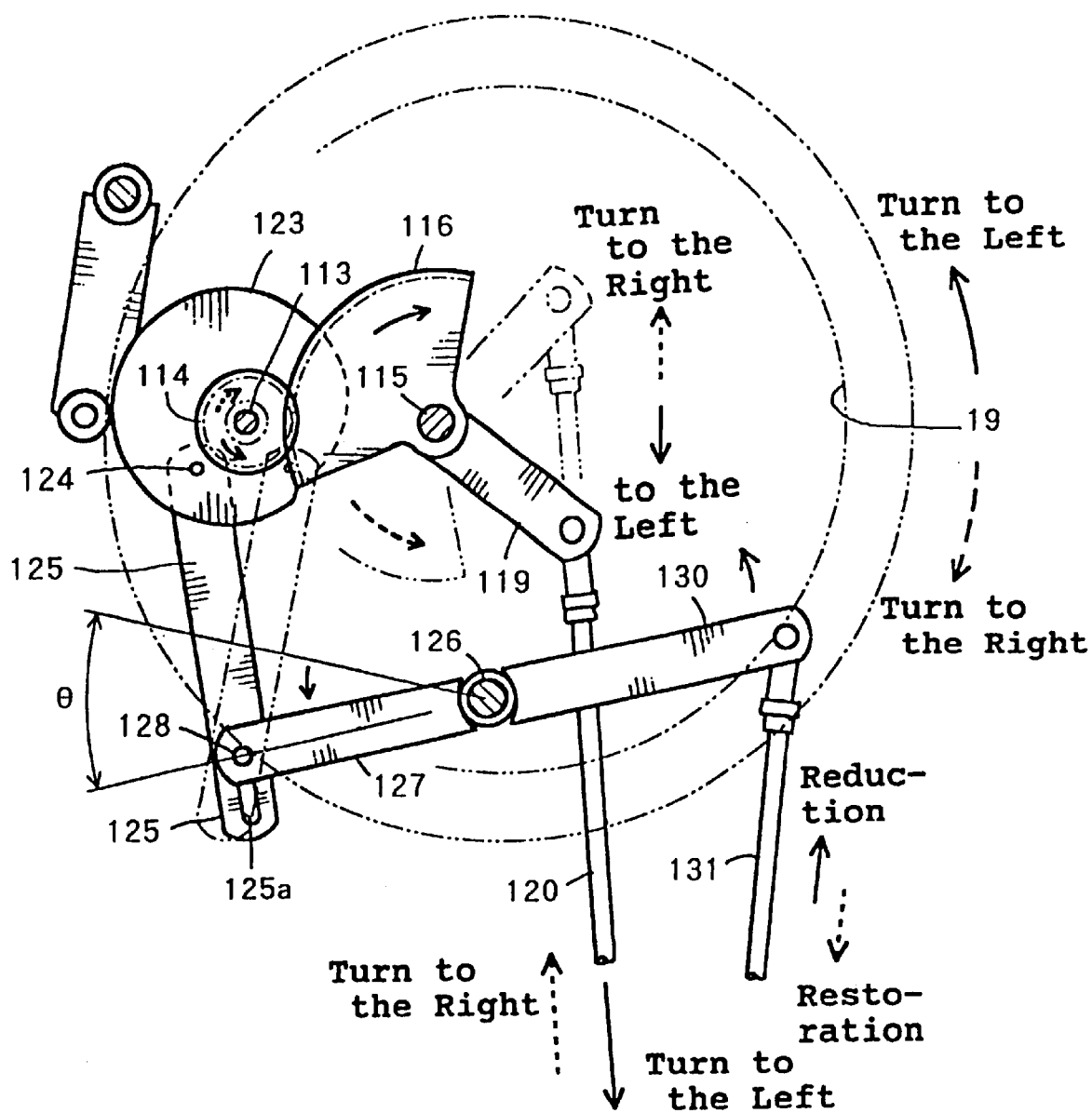
FIG. 12 is a plan view of a steering wheel and members relevant thereto.
Figure 13:
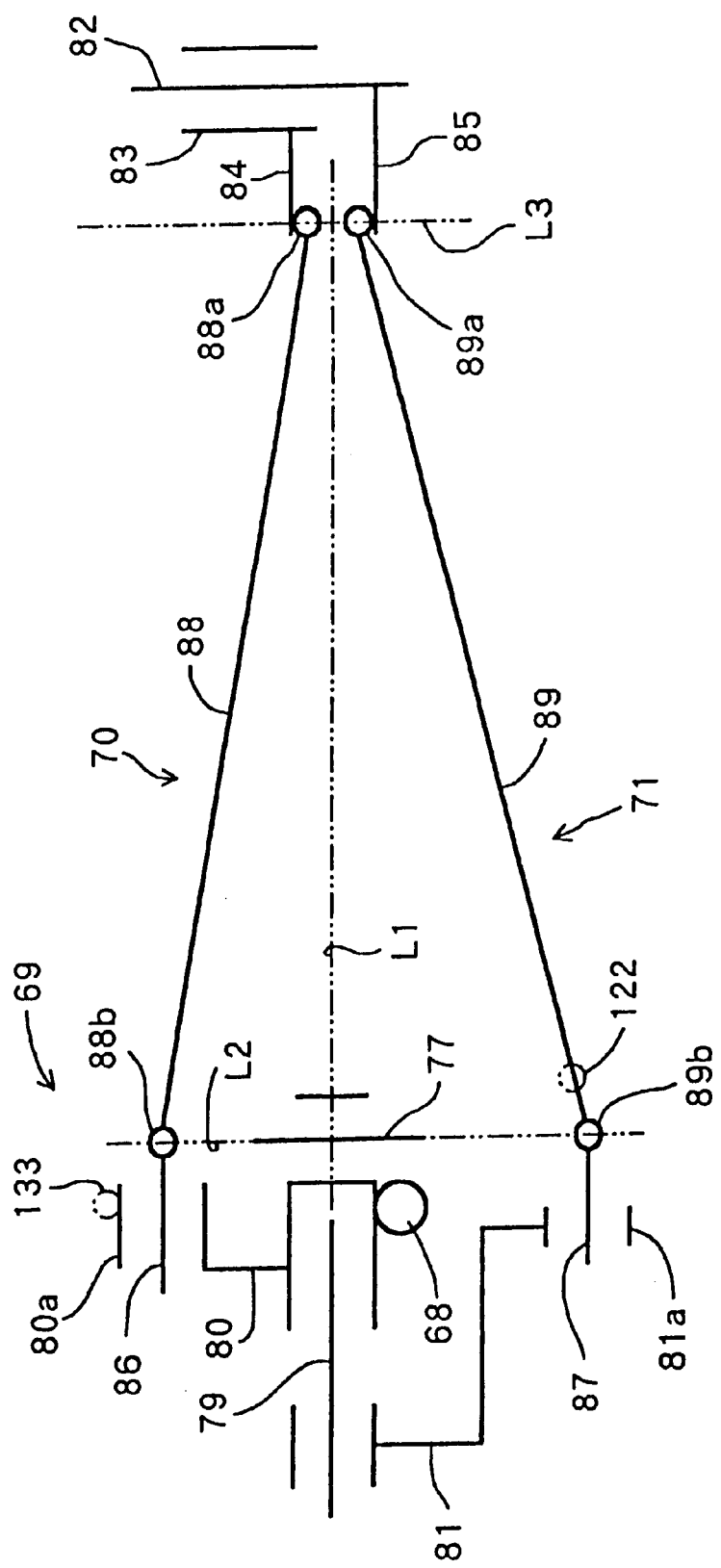
FIG. 13 is a schematic plan view of a linkage.

As shown in FIG. 12, the steering wheel 19 is linked to the position detecting link 125, which, when the wheel is rotated to either side away from its neutral position, will cause the first rocking arm 127 to rock in one and the same direction by an angle of or less than 0 so as to always pull the second reduction rod 133. Thus, a distance between the joints 88$a$ and 88$b$ decreased when the speed change connector 80 is put to its one position corresponding to the forward travel of the combine and slanted to one side indicated by an arrow $\alpha_1$ showing an angle. However, the said distance between the joints 88$a$ and 88$b$ increases when the speed change connector 80 is put to its another position corresponding to the backward travel of the combine and slanted to the other side indicated by another arrow $\alpha_2$ also showing another angle. As a result, the speed change arm 84 is displaced towards the neutral position so that the combine will be decelerated in proportional to the degree at which it is swiveling.

As described above, the universal joints 97$a$ and 98$a$ at which the first rods 97 and 98 are connected respectively to the first rocking arms 95 and 96 respectively included in the speed change and steering systems have their axes in alignment with the shaft 92 supporting the driver's cabin 18. Therefore, that cabin 18 can tilt forward while those systems remaining neutral, even if their linkages are not removed.

Figure 14:
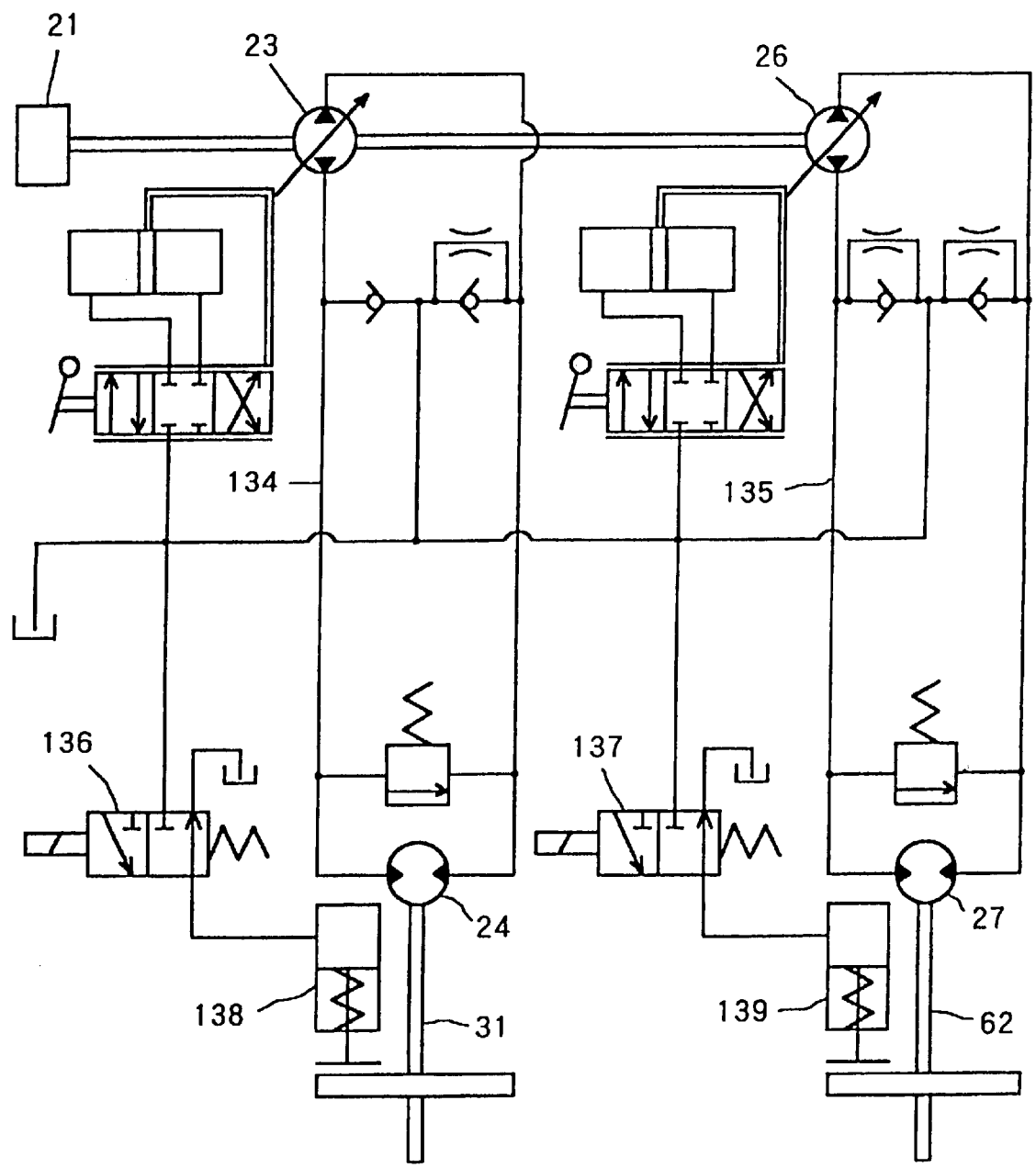
FIG. 14 is a diagram of an oil-hydraulic circuit.

FIGS. 4 and 14 illustrate that a hydraulic circuit comprises loops 134 and 135 that connect the first and second hydraulic pumps 23 and 26 to the first and second hydraulic motors 24 and 27, so that the directions in which the latter are driven may be switched over from 'normal' to 'reverse', or vice versa. Electromagnetic valves 136 and 137 will deactivatably activate brakes 138 and 139, wherein the former brake 138 is used to disable the output shaft 31 of the first motor 24 to rotate, thereby holding still the combine. The latter brake 139 will be used to disable the output shaft 62 of the second motor 27 to rotate, thereby inhibiting the combine from turning itself. A parking brake device 140 is able to inhibit the shaft 49 from rotating itself, thus forcing the combine to stand still until and unless this device is switched off.

FIG. 18 shows a modification in which a manually steering lever 141 substitutes for the steering wheel 19 employed in the embodiment discussed above. This steering lever 141 is rockable to the right or to left about a short shaft 142. A bevel gear 143$a$ fixed on a distal end of the lever 141 is in mesh with another bevel gear 143$b$ fixed on the top of the steering column 113. The rocking motion of the steering lever 141 will cause said column to rotate 113 in normal or reverse direction to activate the linkages 70 and 71 in the manner described hereinbefore. Thus, the steering lever 141 is an alternative steering device mentioned above adapted to cause the combine to adjust its generally straight course or otherwise to make a turning motion.

Figure 19:
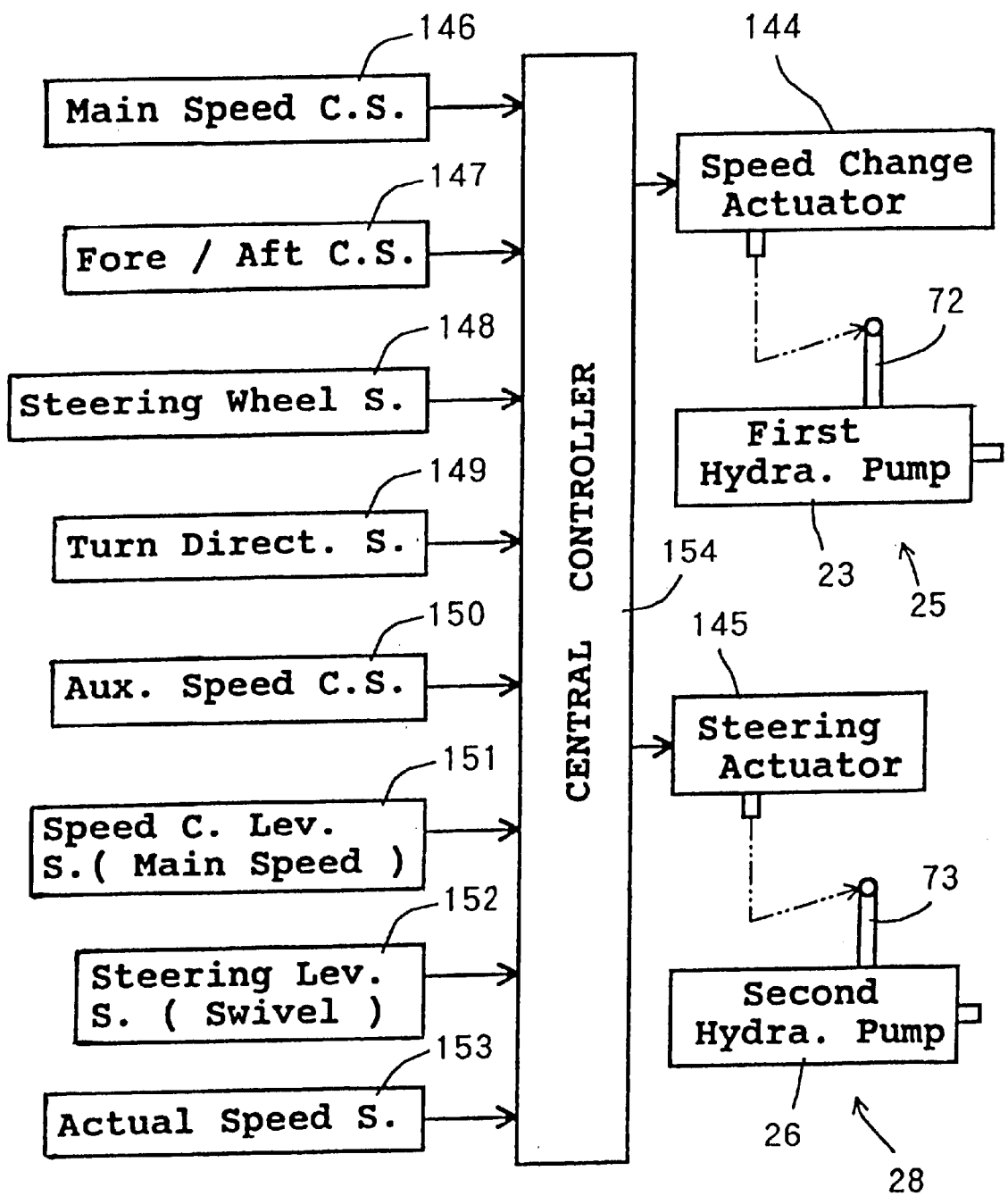
FIG. 19 is a diagram of an electronic controller.
Figure 20:
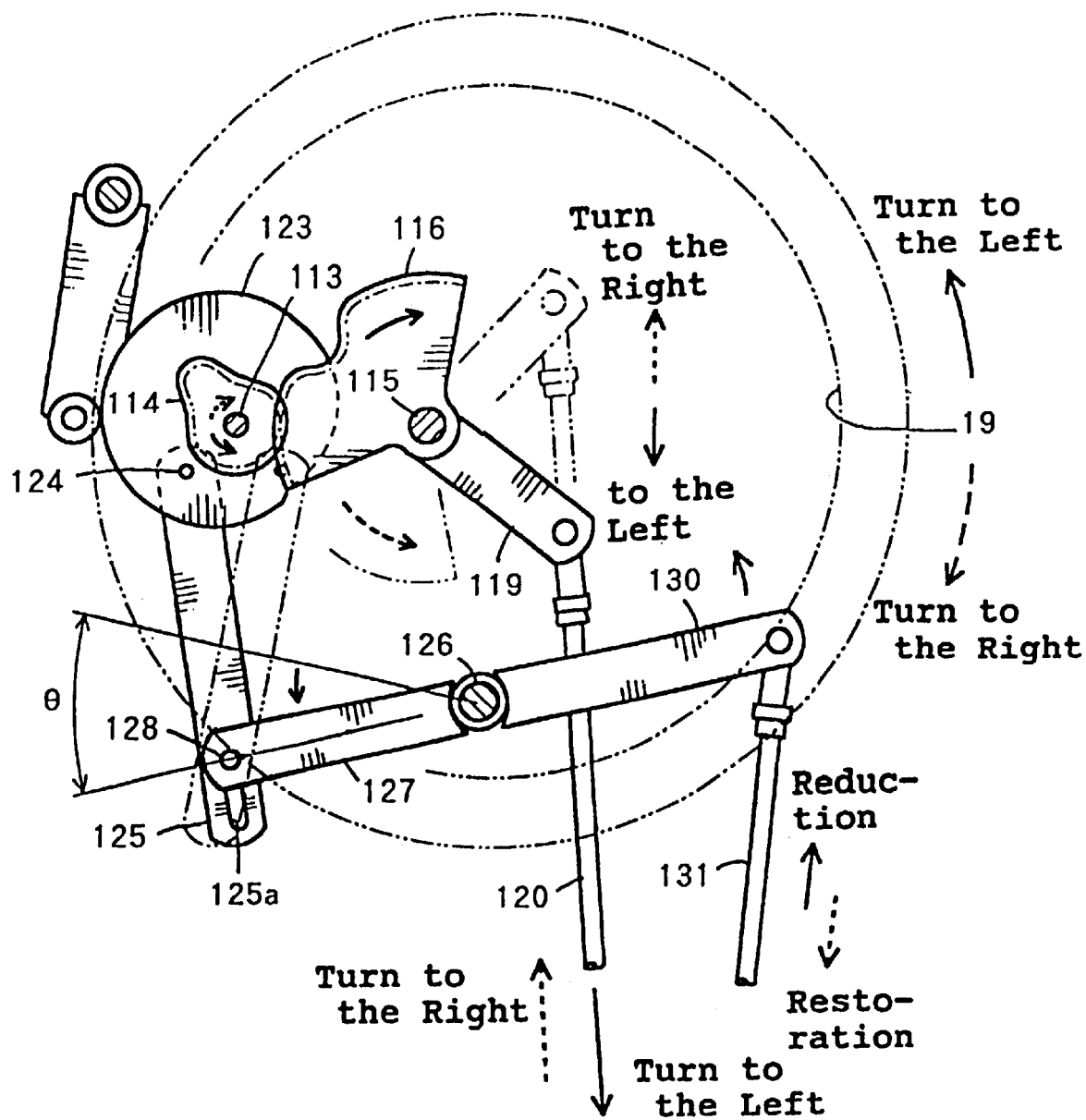
FIG. 20 is a plan view of the members shown in FIG. 12 but modified in part.
Figure 21:
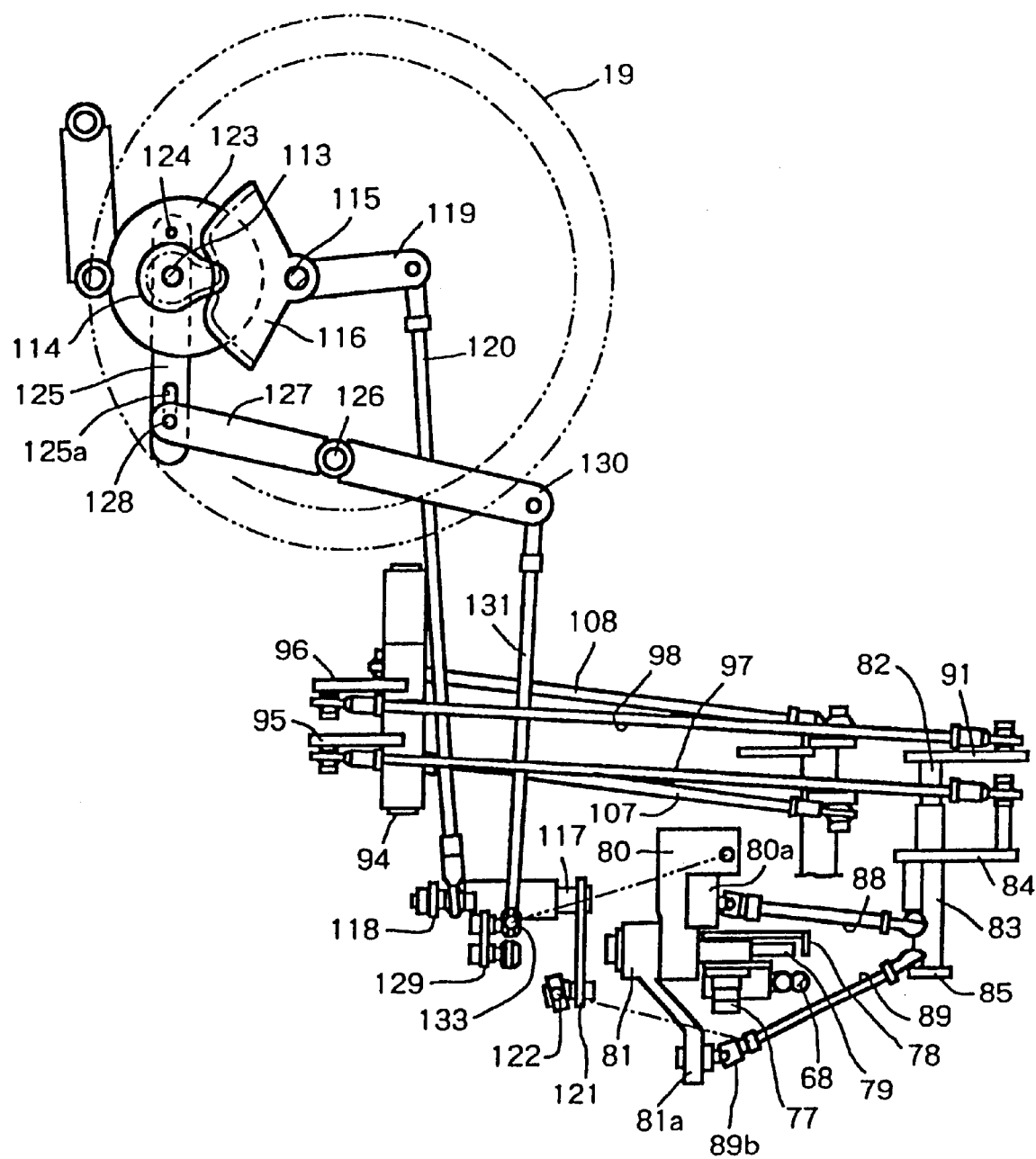
FIG. 21 is a plan view of the members shown in FIG. 7 but modified in part.
Figure 22:
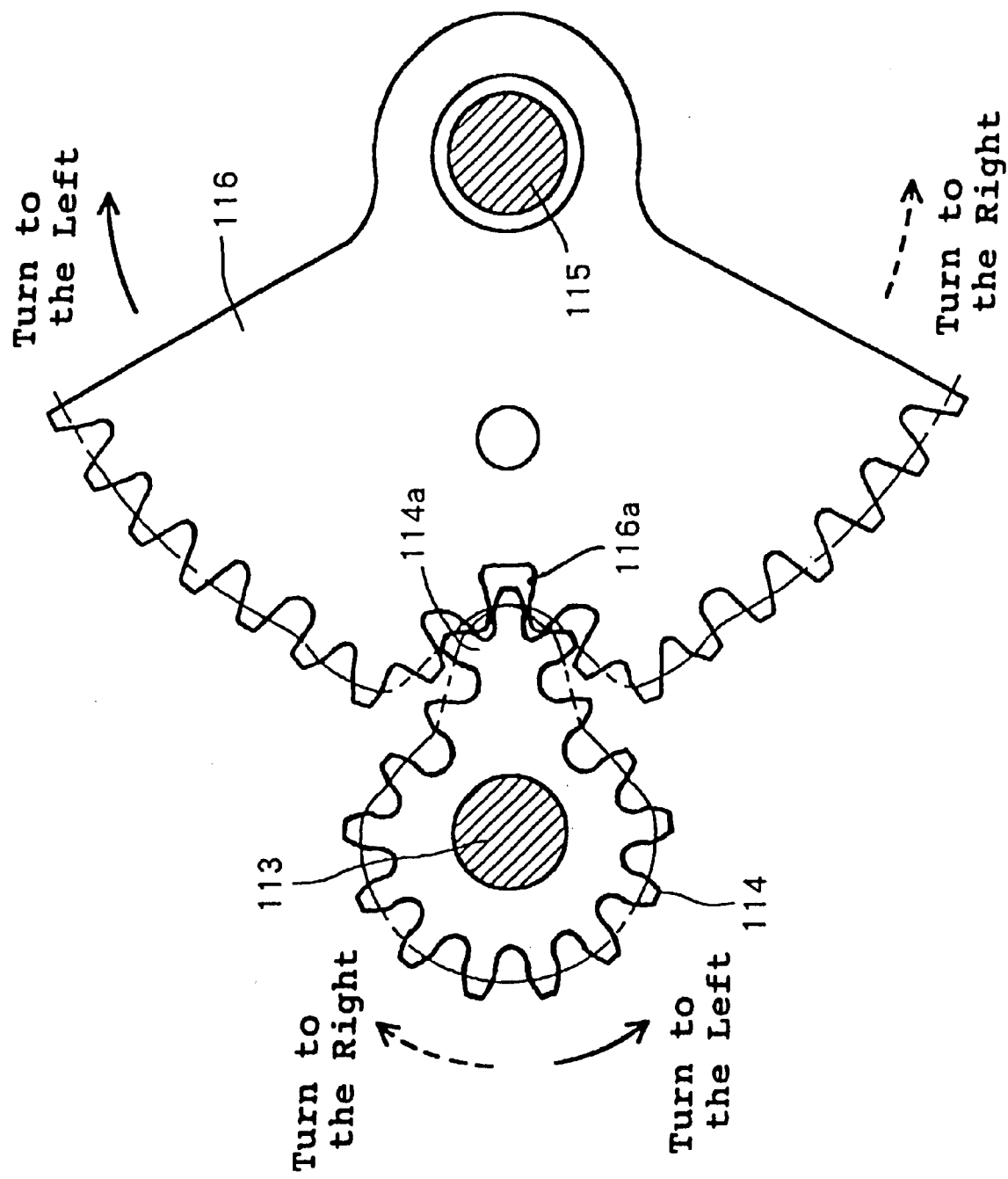
FIG. 22 is a plan view of differentiating gears.
Figure 23:
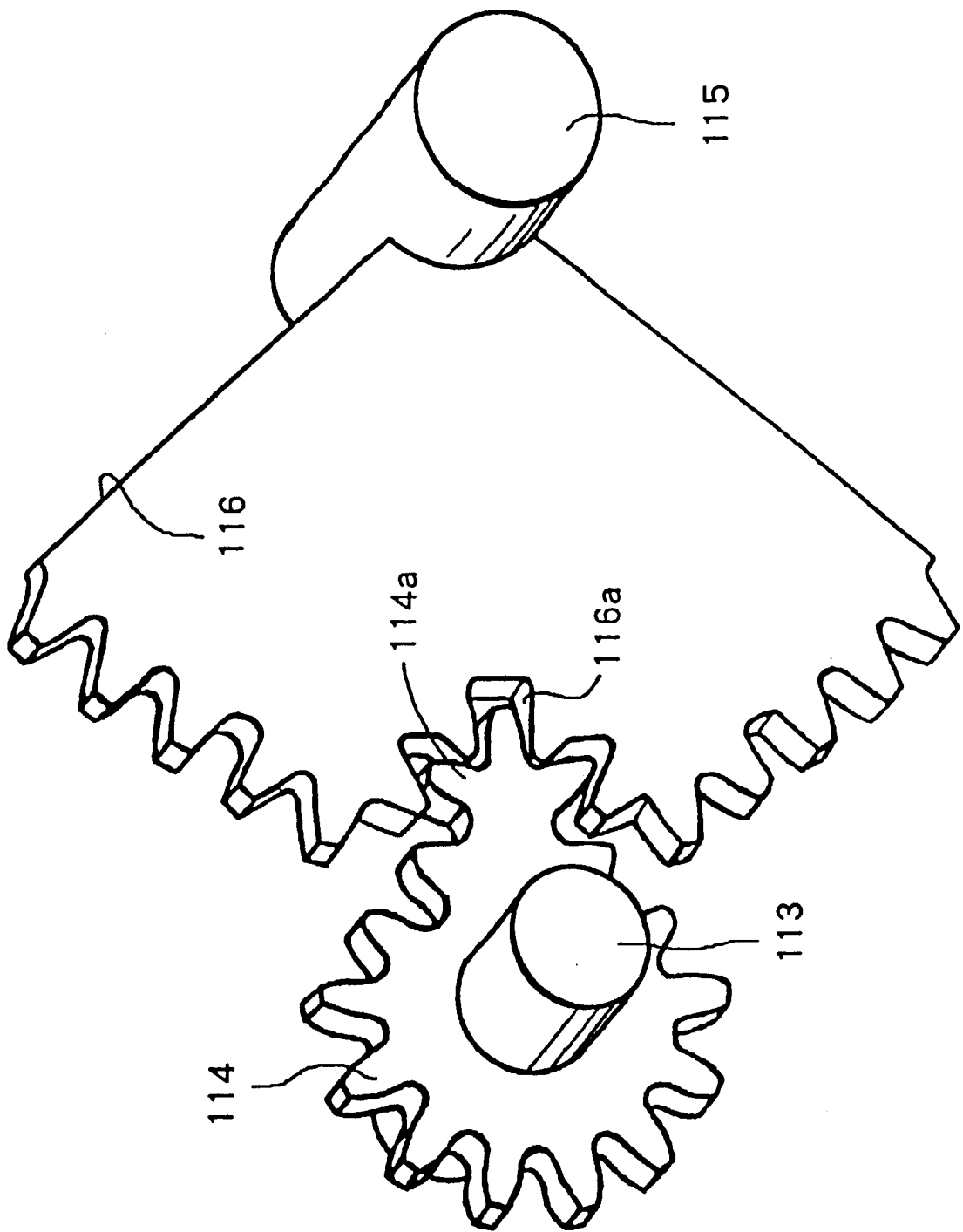
FIG. 23 is a perspective view of the differentiating gears shown in mesh with each other at their neutral position.
Figure 24:
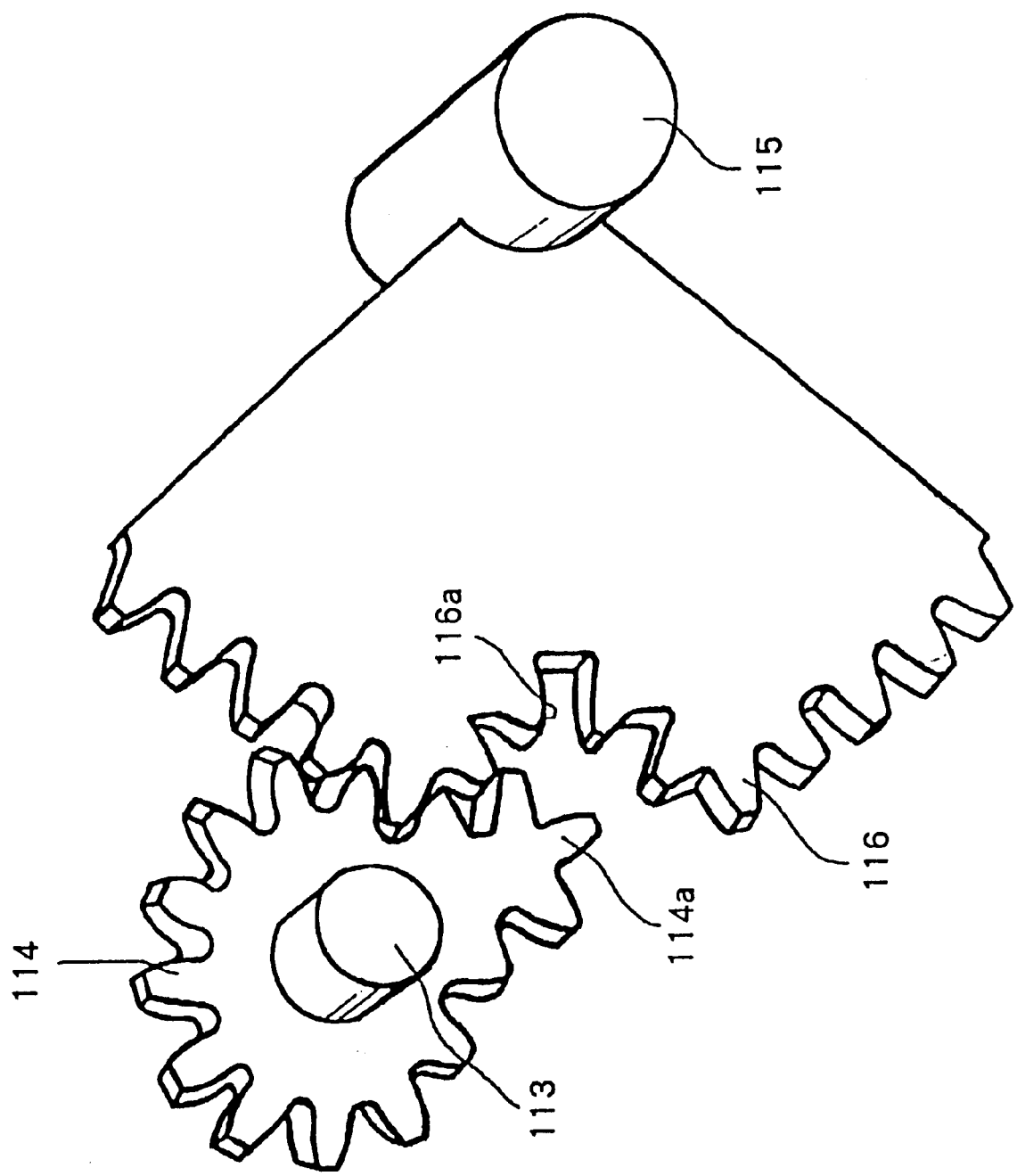
FIG. 24 is a perspective view of the differentiating gears shown in mesh with each other at their position causing the combine to turn.

FIG. 19 illustrates a further embodiment wherein an actuator 144 for changing the speed of the combine and another actuator 145 for steering same are operatively connected to the first and second hydraulic pumps 23 and 26, respectively. In detail, those actuators 144 and 145 are in operative connection with the control levers 72 and 73 serving as trunnions for those pumps 23 and 26 respectively included in the stepless hydraulic speed changers 25 and 28. Further incorporated in this embodiment are: a main speed sensor 146 consisting of a potentiometer for detecting the actual position of the main speed change lever 68, whether the latter is placed in the forward or backward running region; a running direction sensor 147 of an on-off switch type for detecting which region the lever 68 has been placed in; a steering wheel sensor 148 consisting of a further potentiometer for detecting the actual angular position of the steering wheel 19; and a steering direction sensor 147 also of an on-off switch type for detecting which direction (to the right or left, viz., clockwise or counterclockwise) the wheel 19 has been rotated in. Still further elements employed in this embodiment are: an auxiliary speed change sensor 150 of an on-off switch type for detecting the position of the auxiliary speed changer 32; a speed change lever sensor 151 consisting of a potentiometer for detecting the actual position of the speed change control lever 72; a steering lever sensor 152 consisting of another potentiometer for detecting the actual position of the steering control lever 73; and a vehicle speed sensor 153 of a pick-up type for detecting the actual speed of the crawlers 2. All the sensors 146–153 and the actuators 144 and 145 are electrically connected to a central controller 154 consisting of a microcomputer. It is to be noted that the linkages 70 and 71 in the first embodiment is dispensed with in this embodiment. However similarly to the first embodiment, manipulation of the main speed change lever 68 and the steering wheel 19 will cause the combine to change its speed or to turn, through the control levers 72 and 73 operated in this case by the actuators 144 and 145, with aid of the sensors 146–153. Also, the steering wheel 19 as the steering device is electrically connected within the central controller 154 not only with the steerage composed of the second hydraulic pump and motor 26 and 27 but also with the transmission composed of the first hydraulic pump and motor 23 and 24. This embodiment will afford a greater variety of steering modes and functions, with a reduced manufacture cost.

As will be seen in FIGS. 20–25, the pair of gears 114 and 115 that provide the transmission 28 with a manual force applied to the steering wheel 19 may be replaced with a pair of differentiating gears each of a non-circular shape. The gear 114 secured to the steering column 113 and having a center coinciding therewith has a peripheral portion 114*a* protruding radially such that the distance between the center and teeth formed in this portion 114*a* is greater than overall diameter of the gear 114. The other gear 116 of a sector shape has in the middle region of its periphery a recess 116*a* that has also teeth engageable with the teeth of the protruding portion 114*a*. The distance between the shaft 115 for this gear 116 and the teeth formed in and along the recess 116*a* is smaller than overall diameter of this gear 116. Such a protruding portion 114*a* is intended to engage with the recess 116*a* so long as the steering wheel 19 is disposed at its neutral position. The curved line 'A' in FIG. 25 indicates that an initial rotation of a small angle of the steering wheel 19 will in this case be amplified before transmitted to the control lever 73, whereby a quicker initial response is afforded to the steering system. The control apparatus for the combine is also constructed in this modification such that the power output from the engine 21 is transmitted through the one hydraulic speed changer 25 and the differential gear 33 to the right and traction members. The speeds of these traction members are rendered different from each other when the combine is steered as usual, but the modification described here renders the combine more or less sensitive from time to time to the steering wheel being operated. In particular, the combine having to swivel in this modification will respond more sharply to the initial angular displacement of the steering wheel, thus avoiding any delay that will impair steerability.

Figure 25:
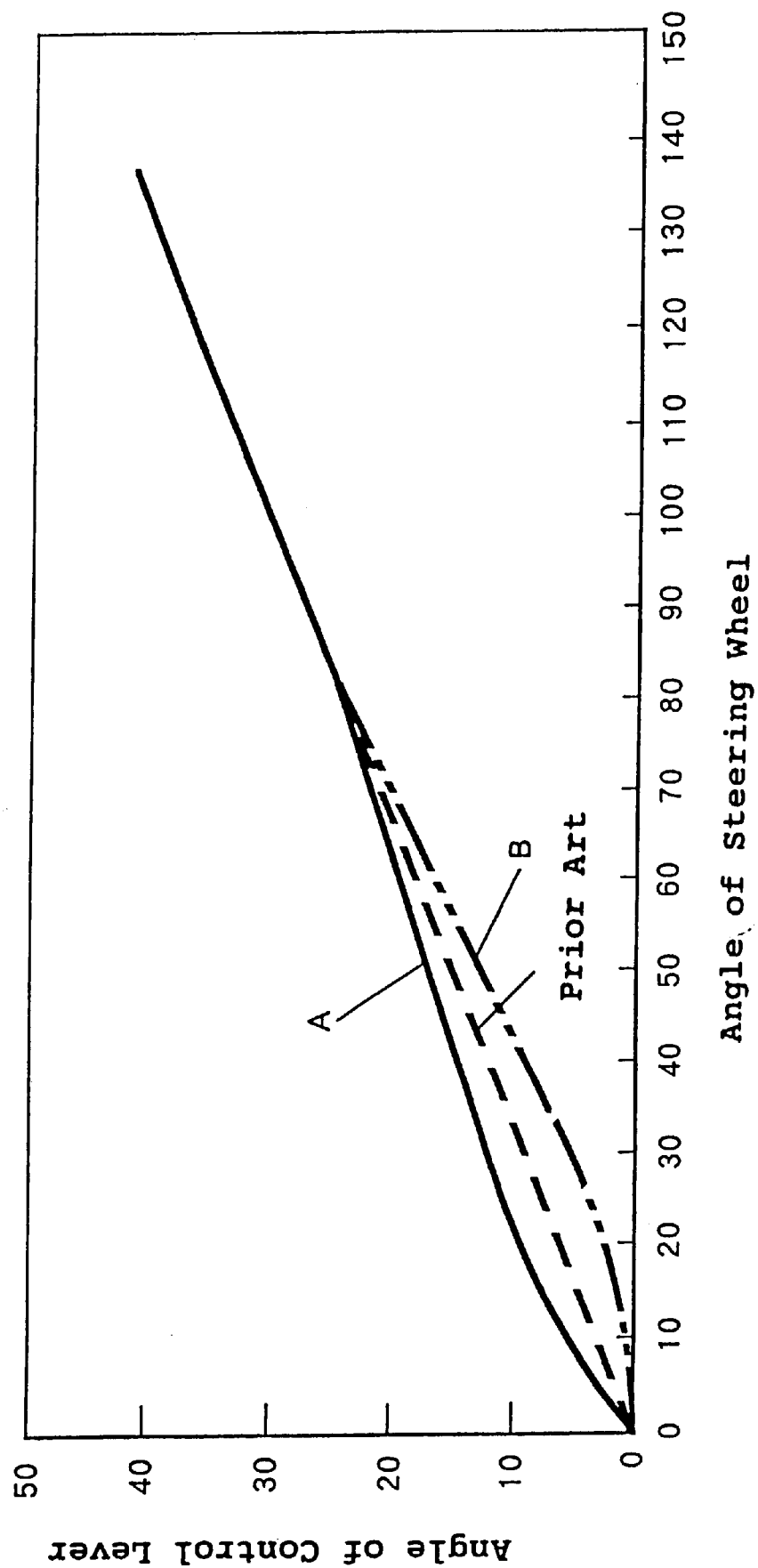
FIG. 25 is a graph showing a relationship between the angle of the steering wheel and the angle of a control lever.
Figure 26:
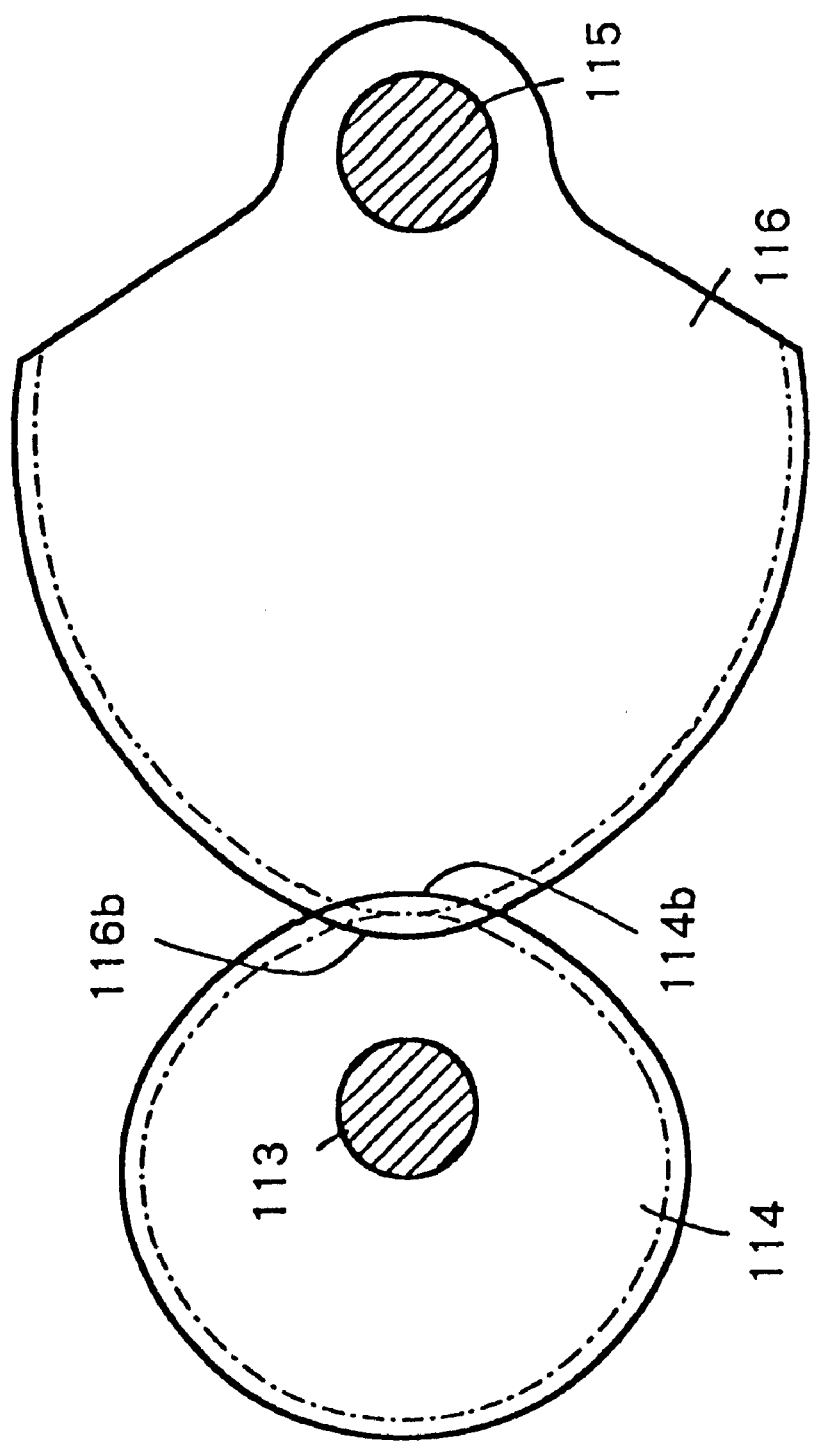
FIG. 26 is a diagram showing the differentiating gears of modified shapes.

Shown in FIG. 26 is another modification in which the gear 114 secured to the steering column 113 serving as its center has, in contrast with that just described above, a peripheral portion 114*b* depressed radially such that the distance between the center and teeth formed in this portion 114*b* is smaller than overall diameter of the gear 114. The other gear 116 of a sector shape has in the middle region of its periphery a bulged portion 116*b* that has also teeth engageable with the teeth of the depressed portion 114*b*. The distance between the shaft 115 for this gear 116 and the teeth formed in and along the bulged portion 116*b* is greater than overall diameter of this gear 116. Such a depressed portion 114*b* is intended to engage with the bulged portion 116*b* so long as the steering wheel 19 is disposed at its neutral position. The curved line 'B' in FIG. 25 indicates that an initial rotation of a small angle of the steering wheel 19 will in this case be attenuated somewhat to render more obtuse the initial response of such a steering system than in the usual or conventional systems. From another point of view, an initial notation within a small angular range of the steering wheel 19 in this case will cause the combine to merely swing a much smaller angle, scarcely deviating from its straight path.

In standard or usual cases, the critical angle for initial rotation of the steering wheel is designed to be about 30 degrees at which the vehicle practically starts to swing. However in the former modified case discussed above, such a critical angle may be made smaller to be for instance about 18 degrees, thus sharpening the initial response of the vehicle to the steering operation. The latter modification will make said critical angle to be about 40 degrees delaying the initial response. In this way, the steering system can be adjusted herein to match the skillfulness and/or character of each driver.

FIG. 25 shows a relationship observed between the angle of the steering wheel 19 rotated clockwise or counterclockwise and the angle of the control lever 73 caused thereby to rock. The mobile agricultural machine exemplified here does also comprise a transmission mainly composed of the first hydraulic pump and motor 23 and 24 for transmitting the power output from the engine 21 to the right and traction members, viz., crawlers 2, and a steerage mainly composed of the second hydraulic pump and motor 26 and 27 so that the speeds of these traction members are rendered different from each other under control by the steering device, viz., steering wheel 19. However in this last case, differentiating members that are a pair of a gear 114 and a further gear 116 of a sector shape mating therewith do intervene between the steering wheel 19 and the second hydraulic pump and motor 26 and 27. Due to those differentiating gears, the second hydraulic pump and motor 26 and 27 will respond to the steering wheel 19 in a curvilinear manner. The agricultural machine will not be steered too sharply or too obtusely for the driver to control it moderately and free from any incongruity between his feeling of operating the steering wheel and the actual motion of said agricultural vehicle. When the latter harvests a row of grain stalks or performs an agricultural work along a ridge in a farm, its soil is sometimes not uniform among its regions in wetness, in content of mud and/or in content of sand. Even if the right and left crawlers 2 would thus be subjected to slippery to different degrees, such a difference will be compensated well to avoid any impermissible delay or acuteness causing the machine to meander.

In a more preferable modification, an inner control zone including the neutral position of the steering wheel 19 provides a curved relationship between the rotation angle thereof and the extent to which the second hydraulic pump and motor 26 and 27 are controlled by the steering wheel 19. In contrast with the inner zone, an outer control zone disposed outside the former and remote from the neutral position of said wheel 19 does provide a linear relationship between same and the pump and motor 26 and 29. Such a compound type of the control system is intended to optimize both the straightly running mode along the row or ridge and the spinning turn mode at the bare end of a farm. In detail, the vehicle running fast under the former mode should be able to make a swing of a small radius without any noticeable delay or any meandering motion on one hand, and said vehicle sharply turning while moving slower under the latter mode should not disturb the driver's normal feeling of operating the vehicle on the other hand. In order to meet these requirements, the ratio of the controlled degree of those second pump and motor 26 and 27 to the operated extent of the steering wheel 19 may be designed greater for the inner control zone than that for the outer one. In this first case, the ridge following action of said vehicle will be rendered so quick as diminishing any delay in its swinging motion and also affording ensuring a higher efficiency of its harvesting work. Alternatively, the ratio of the controlled degree of those second pump and motor 26 and 27 to the operated extent of the steering wheel 19 may be designed smaller for the inner control zone than that for the outer one. In this alternative case, the vehicle can be steered neither disturbing the driver's normal feeling of driving the vehicle even under a slippery soil condition of the farm, nor causing it to make a meandering motion that will impair the efficiency of its harvesting work.

What is claimed is:

1. A mobile agricultural machine, comprising:
   a pair of right and left traction members;
   a transmission;
   a main speed change device operable to transmits at any speed ratio a driving force from an engine through said transmission to said traction members so that said traction members are individually driven at any traveling speed;
   a steerage means; and
   a steering device operable to cause said steerage means to differentiate the traveling speeds between said traction members, characterized in that both said transmission and steerage means have respective power-transmitting structures constructed such that a normal running load at the highest speed is substantially equal to a maximum traveling load when swiveling.

2. A mobile agricultural machine as defined in claim 1, characterized in that said steering device includes a manual steering member.

3. A mobile agricultural machine as defined in claim 2, characterized in that said manual steering member is a steering wheel.

4. A mobile agricultural machine as defined in claim 2, characterized in that said manual steering member is a rockable manual lever.

5. A mobile agricultural machine as defined in claim 2, characterized in that a mechanical linkage operatively connects said manual steering member to said transmission and said steerage means.

6. A mobile agricultural machine as defined in claim 2, characterized in that an electronic controller operatively connects said manual steering member to said transmission and said steerage means.

7. A mobile agricultural machine as defined in claim 1, wherein said characterization that both said transmission and steerage means have respective power-transmitting structures constructed such that a normal running load at the highest speed is substantially equal to a maximum traveling load when swiveling is effected by first and second means for mutually exclusively inhibiting the rotation of first and second hydraulic motors in a first mode and first and second hydraulic pumps for variably driving said first and second hydraulic motors in combination in a second mode to thereby drive said traction members at equal speeds in a straight mode and at differential speeds in turning and said swiveling modes.

8. A mobile agricultural machine, comprising:
   a pair of right and left traction members;
   a transmission;
   a main speed change device operable to transmit, at any speed ratio a driving force from an engine through said transmission to said traction members so that said traction members are driven at any traveling speed;
   a steerage means with a reduction ratio output set greater than that of said transmission for high-speed running; and
   a steering device operable to cause said steerage means to differentiate the traveling speeds between said traction members, characterized in that both said transmission and steerage means have respective power-transmitting structures constructed such that a normal running load at the highest speed is substantially equal to a maximum traveling load when swiveling.

9. A mobile agricultural machine as defined in claim 8, characterized in that said steering device includes a manual steering member.

10. A mobile agricultural machine as defined in claim 9, characterized in that said manual steering member is a steering wheel.

11. A mobile agricultural machine as defined in claim 9, characterized in that said manual steering member is a rockable manual lever.

12. A mobile agricultural machine as defined in claim 9, characterized in that a mechanical linkage operatively connects said manual steering member to said transmission and said steerage means.

13. A mobile agricultural machine as defined in claim 9, characterized in that an electronic controller operatively connects said manual steering member to said transmission and said steerage means.

14. A mobile agricultural machine, comprising:
   a pair of right and left traction members;
   a transmission;
   a main speed change device operable to transmit, at any speed ratio a driving force from an engine through said transmission to said traction members so that said traction members are driven at any traveling speed;
   a steerage means with a reduction ratio output set smaller than that of said transmission for low-speed running; and
   a steering device operable to cause said steerage means to differentiate the traveling speeds between said traction members, characterized in that both said transmission and steerage means have respective power-transmitting structures constructed such that a normal running load at the highest speed is substantially equal to a maximum traveling load when swiveling.

15. A mobile agricultural machine as defined in claim 14, characterized in that said steering device includes a manual steering member.

16. A mobile agricultural machine as defined in claim 15, characterized in that said manual steering member is a steering wheel.

17. A mobile agricultural machine as defined in claim 15, characterized in that said manual steering member is a rockable manual lever.

18. A mobile agricultural machine as defined in claim 15, characterized in that a mechanical linkage operatively connects said manual steering member to said transmission and said steerage means.

19. A mobile agricultural machine as defined in claim 15, characterized in that an electronic controller operatively connects said manual steering member to said transmission and said steerage means.

20. A mobile agricultural machine comprising:
   a pair of right and left traction members;
   a transmission;
   a main speed change device operable to transmits at any speed ratio a driving force from an engine through said transmission to said traction members so that said traction members are individually driven at any traveling speed;
   a steerage means; and
   a steering device operable to cause said steerage means to differentiate the traveling speeds between said traction members, characterized in that said steering device has a ridge-following position, a braked turn position and a spinning turn position, all within a range defined between a straight traveling position and a limit position for the most acute turn of the smallest radius; and said characterization that said steering device has a ridge-following position, a braked turn position and a spinning turn position, all within a range defined between a straight traveling position and a limit position for the most acute turn of the smallest radius is effected by first and second means for mutually exclusively inhibiting the rotation of first and second hydraulic motors in a first mode and first and second hydraulic pumps for variably driving said first and second hydraulic motors in combination in a second mode to thereby drive said traction members at equal speeds in a ridge-following mode and at differential speeds in turning and spinning turn modes.

21. A mobile agricultural machine as defined in claim 20, characterized in that said steering device includes a manual steering member.

22. A mobile agricultural machine as defined in claim 21, characterized in that said manual steering member is a steering wheel.

23. A mobile agricultural machine as defined in claim 21, characterized in that said manual steering member is a rockable manual lever.

24. A mobile agricultural machine as defined in claim 21, characterized in that a mechanical linkage operatively connects said manual steering member to said transmission and said steerage means.

25. A mobile agricultural machine as defined in claim 21, characterized in that an electronic controller operatively connects said manual steering member to said transmission and said steerage means.

26. A mobile agricultural machine as defined by claim 20, characterized in that said braked turn position is interposed between said ridge-following position and said spinning turn position.

27. A mobile agricultural machine as defined in claim 26, characterized in that said steering device includes a manual steering member.

28. A mobile agricultural machine as defined in claim 27, characterized in that said manual steering member is a steering wheel.

29. A mobile agricultural machine as defined in claim 27, characterized in that said manual steering member is a rockable manual lever.

30. A mobile agricultural machine as defined in claim 27, characterized in that a mechanical linkage operatively connects said manual steering member to said transmission and said steerage means.

31. A mobile agricultural machine as defined in claim 27, characterized in that an electronic controller operatively connects said manual steering member to said transmission and said steerage means.

32. A mobile agricultural machine as defined by claim 20, characterized in that the maximum angle of steering to which said steering device can be rotated in one angular direction is set at about 135 degrees.

33. A mobile agricultural machine as defined in claim 32, characterized in that said steering device includes a manual steering member.

34. A mobile agricultural machine as defined in claim 33, characterized in that said manual steering member is a steering wheel.

35. A mobile agricultural machine as defined in claim 33, characterized in that said manual steering member is a rockable manual lever.

36. A mobile agricultural machine as defined in claim 33, characterized in that a mechanical linkage operatively connects said manual steering member to said transmission and said steerage means.

37. A mobile agricultural machine as defined in claim 33, characterized in that an electronic controller operatively connects said manual steering member to said transmission and said steerage means.

38. A mobile agricultural machine, comprising:
   a pair of right and left traction members;
   a transmission including means for inhibiting turning;
   a main speed change device operable to transmit at any speed ratio a driving force from an engine through said transmission to said traction members so that said traction members are driven at any traveling speed;
   a steerage means;
   a steering device operable to cause said steerage means to differentiate the traveling speeds between said traction members, characterized in that said steering device is operatively connected by a differentiator to said steerage means in such a manner as to provide a curvilinear relationship between the angular distance or intensity of an input from said steering device to said steerage means and the intensity of a resultant controlling output from said steerage means; and
   wherein said steerage means is effected by first and second means for mutually exclusively inhibiting the rotation of first and second hydraulic motors in a first mode and first and second hydraulic pumps for variably driving said first and second hydraulic motors in combination in a second mode to thereby drive said traction members at differential speeds.

39. A mobile agricultural machine as defined in claim 38, characterized in that said steering device includes a manual steering member.

40. A mobile agricultural machine as defined in claim 39, characterized in that said manual steering member is a steering wheel.

41. A mobile agricultural machine as defined in claim 39, characterized in that said manual steering member is a rockable manual lever.

42. A mobile agricultural machine as defined in claim 39, characterized in that a mechanical linkage operatively connects said manual steering member to said transmission and said steerage means.

43. A mobile agricultural machine as defined in claim 39, characterized in that an electronic controller operatively connects said manual steering member to said transmission and said steerage means.

44. A mobile agricultural machine as defined by claim 38, characterized in that said steering device has a central range including a central position for straight running and side regions continuing from and sandwiching said central position, such that a curvilinear relationship applies to said central range, with a linear and proportional relationship being allotted to said side regions.

45. A mobile agricultural machine as defined in claim 44, characterized in that said steering device includes a manual steering member.

46. A mobile agricultural machine as defined in claim 45, characterized in that said manual steering member is a steering wheel.

47. A mobile agricultural machine as defined in claim 45, characterized in that said manual steering member is a rockable manual lever.

48. A mobile agricultural machine as defined in claim 45, characterized in that a mechanical linkage operatively connects said manual steering member to said transmission and said steerage means.

49. A mobile agricultural machine as defined in claim 45, characterized in that an electronic controller operatively connects said manual steering member to said transmission and said steerage means.

50. A mobile agricultural machine as defined by claim 28, characterized in that the ratio of a command output from said steerage means per unit angular displacement of said steering device within a central range is set greater than that which is effective outside said central range.

51. A mobile agricultural machine as defined in claim 50, characterized in that said steering device includes a manual steering member.

52. A mobile agricultural machine as defined in claim 51, characterized in that said manual steering member is a steering wheel.

53. A mobile agricultural machine as defined in claim 51, characterized in that said manual steering member is a rockable manual lever.

54. A mobile agricultural machine as defined in claim 51, characterized in that a mechanical linkage operatively connects said manual steering member to said transmission and said steerage means.

55. A mobile agricultural machine as defined in claim 51, characterized in that an electronic controller operatively connects said manual steering member to said transmission and said steerage means.

56. A mobile agricultural machine as defined by claim 38, characterized in that the ratio of a command output from said steerage means per unit angular displacement of said steering device within a central range is set smaller than that which is effective outside said central range.

57. A mobile agricultural machine as defined in claim 56, characterized in that said steering device includes a manual steering member.

58. A mobile agricultural machine as defined in claim 57, characterized in that said manual steering member is a steering wheel.

59. A mobile agricultural machine as defined in claim 57, characterized in that said manual steering member is a rockable manual lever.

60. A mobile agricultural machine as defined in claim 57, characterized in that a mechanical linkage operatively connects said manual steering member to said transmission and said steerage means.

61. A mobile agricultural machine as defined in claim 57, characterized in that an electronic controller operatively connects said manual steering member to said transmission and said steerage means.

62. A mobile agricultural combine, comprising:
a body;
a pair of right and left traction members connected to the body;
a hydraulic transmission including means for inhibiting turning;
a differential gear apparatus;
said hydraulic transmission cooperating with said differential gear apparatus to transmit a driving force from an engine to said traction members to thereby drive said body at any traveling speeds;
a steering mechanism which in turn comprises a manual steering member; and
a hydraulic steerage operable to transmit any angular displacement of said manual steering member to said differential gear apparatus so as to differentiate travel speeds between said traction members, characterized in that said steering mechanism comprises differentiating gears for transmitting angular displacement of said manual steering member to said hydraulic steerage; and
said hydraulic steerage is effected by first and second means for mutually exclusively inhibiting the rotation of first and second hydraulic motors in a first mode and first and second hydraulic pumps for variably driving said first and second hydraulic motors in combination in a second mode to thereby drive said traction members at equal speeds in a ridge-following mode and at differential speeds in turning and spinning turn modes.

63. A mobile agricultural machine as defined in claim 62, characterized in that said manual steering member is a steering wheel.

64. A mobile agricultural machine as defined in claim 62, characterized in that said manual steering member is a rockable manual lever.

65. A mobile agricultural machine as defined in claim 62, characterized in that a mechanical linkage operatively connects said manual steering member to said transmission and said steerage means.

66. A mobile agricultural machine as defined in claim 62, characterized in that an electronic controller operatively connects said manual steering member to said transmission and said steerage means.

67. A mobile agricultural machine as defined by claim 62, characterized in that said differentiating gears are designed to attenuate an initial output force of said manual steering member.

68. A mobile agricultural machine as defined in claim 67, characterized in that said manual steering member is a steering wheel.

69. A mobile agricultural machine as defined in claim 67, characterized in that said manual steering member is a rockable manual lever.

70. A mobile agricultural machine as defined in claim 67, characterized in that a mechanical linkage operatively connects said manual steering member to said transmission and said steerage means.

71. A mobile agricultural machine as defined in claim 67, characterized in that an electronic controller operatively connects said manual steering member to said transmission and said steerage means.

72. A mobile agricultural combine, comprising:
a body;
a pair of right and left traction members connected to the body;
a hydraulic transmission;
a differential gear apparatus;
said hydraulic transmission cooperating with said differential gear apparatus to transmit a driving force from an engine to said traction members to thereby drive said body at any traveling speeds;
a steering mechanism which in turn comprises a manual steering member; and
a hydraulic steerage operable to transmit any angular displacement of said manual steering member to said differential gear apparatus so as to differentiate travel speeds between said traction members, characterized in that said steering mechanism comprises differentiating gears designed to amplify an initial output force of said manual steering member for transmitting angular displacement of said manual steering member to said hydraulic steerage.

73. A mobile agricultural machine as defined in claim 72, characterized in that said manual steering member is a steering wheel.

74. A mobile agricultural machine as defined in claim 72, characterized in that said manual steering member is a rockable manual lever.

75. A mobile agricultural machine as defined in claim 72, characterized in that a mechanical linkage operatively connects said manual steering member to said transmission and said steerage means.

76. A mobile agricultural machine as defined in claim 72, characterized in that an electronic controller operatively connects said manual steering member to said transmission and said steerage means.

* * * * *

UNITED STATES PATENT AND TRADEMARK OFFICE
CERTIFICATE OF CORRECTION

PATENT NO.      : 6,408,960 B1
DATED           : June 25, 2002
INVENTOR(S)     : Shigehiro Hidaka et al.

It is certified that error appears in the above-identified patent and that said Letters Patent is hereby corrected as shown below:

<u>Column 1,</u>
Line 5, should read -- September 23, 1998 --

Signed and Sealed this

Nineteenth Day of November, 2002

Attest:

Attesting Officer

JAMES E. ROGAN
*Director of the United States Patent and Trademark Office*